United States Patent
Turkelson et al.

(10) Patent No.: US 10,755,128 B2
(45) Date of Patent: Aug. 25, 2020

(54) SCENE AND USER-INPUT CONTEXT AIDED VISUAL SEARCH

(71) Applicant: Slyce Acquisition Inc., Washington, DC (US)

(72) Inventors: Adam Turkelson, Washington, DC (US); Kyle Martin, Washington, DC (US); Sethu Hareesh Kolluru, Washington, DC (US)

(73) Assignee: Slyce Acquisition Inc., Washington, DC (US)

(*) Notice: Subject to any disclaimer, the term of this patent is extended or adjusted under 35 U.S.C. 154(b) by 0 days.

(21) Appl. No.: 16/719,710

(22) Filed: Dec. 18, 2019

(65) Prior Publication Data

US 2020/0193206 A1 Jun. 18, 2020

Related U.S. Application Data

(60) Provisional application No. 62/781,446, filed on Dec. 18, 2018, provisional application No. 62/781,432, filed on Dec. 18, 2018.

(51) Int. Cl.
*G06K 9/00* (2006.01)
*G06K 9/32* (2006.01)
(Continued)

(52) U.S. Cl.
CPC ......... *G06K 9/3233* (2013.01); *G06K 9/4604* (2013.01); *G06K 9/6256* (2013.01);
(Continued)

(58) Field of Classification Search
None
See application file for complete search history.

(56) References Cited

U.S. PATENT DOCUMENTS 8,644,624 B2 2/2014 Tao et al.
9,558,268 B2 1/2017 Tuzel et al.
(Continued)

FOREIGN PATENT DOCUMENTS

CN 108052966 A 5/2018

OTHER PUBLICATIONS

Marques, Oge, "Scene Classification Using Deep Learning: Deep Learning—MATLAB & Simulink" https://blogs.mathworks.com/deep-learning/2019/11/25scene-classification-using-deep-learning/ Nov. 25, 2019 (9 pages).

(Continued)

*Primary Examiner* — Wei Wen Yang
(74) *Attorney, Agent, or Firm* — Pillsbury Winthrop Shaw Pittman, LLP

(57) ABSTRACT

Provided is a technique for determining a context of an image and an object depicted by the image based on the context. A trained context classification model may determine a context of an image, and a trained object recognition model may determine an object depicted by the image based on the image and the context. Provided is also a technique for determining an object depicted within an image based on an input location of an input detected by a display screen. An object depicted within an image may be detected based on a distance in feature space between an image feature vector of an image and a feature vector of the object, and a distance in pixel-space between an input location of an input and location of the object within the image.

27 Claims, 11 Drawing Sheets

(51) Int. Cl.
*G06K 9/46* (2006.01)
*G06T 1/00* (2006.01)
*G06K 9/62* (2006.01)
*G06T 5/00* (2006.01)

(52) U.S. Cl.
CPC .......... *G06K 9/6267* (2013.01); *G06T 1/0014* (2013.01); *G06T 5/009* (2013.01); *G06T 2207/20132* (2013.01)

(56) References Cited

U.S. PATENT DOCUMENTS

| | | |
|---|---|---|
| 10,410,096 B2 | 9/2019 | Dijkman et al. |
| 2013/0054603 A1* | 2/2013 | Birdwell .............. G06K 9/6224 707/738 |
| 2014/0172643 A1 | 6/2014 | Fazl Ersi et al. |
| 2017/0083792 A1* | 3/2017 | Rodriguez-Serrano ..................... G06F 16/54 |
| 2017/0304732 A1* | 10/2017 | Velic .................. G06K 9/00201 |
| 2018/0204111 A1* | 7/2018 | Zadeh .................. G06N 3/0436 |
| 2019/0163982 A1* | 5/2019 | Block .................. G06K 9/6277 |

OTHER PUBLICATIONS

Howard et al., "MobileNets: Efficient Convolutional Neural Networks for Mobile Vision Applications," Google Inc., arZiv:1704. 04861v1 [cs.CV] Apr. 17, 2017 (9 pages).

Wang, Chi-Feng, "A Basic Introduction to Separable Convolutions," Towards Data Science https://towardsdatascience.com/a-basic-introduction-to-separable-convolutions-b99ec3102728 Aug. 13, 2018 (15 pages).

Chandra, Harsh, "Hardware acceleration for machine learning on Apple and Android devices," https://heartbeat.fritz.ai/hardware-acceleration-for-machine-learning-on-apple-and-android-f3e6ca85bda6 Oct. 8, 2018 (19 pages).

Solano, Ale, Human pose estimation using OpenPose with TensorFlow (Part 1), https://arvrjourney.com/human-pose-estimation-using-openpose-with-tensorflow-part-1-7dd4ca5c8027 Oct. 2, 2017 (14 pages).

* cited by examiner

SCENE AND USER-INPUT CONTEXT AIDED VISUAL SEARCH

CROSS-REFERENCE TO RELATED APPLICATIONS

This patent claims the benefit of U.S. Provisional Patent Application No. 62/781,446, filed Dec. 18, 2018, titled "MULTI-CHANNEL COMPUTER-VISION OBJECT DETECTION," and also claims the benefit of U.S. Provisional Patent Application No. 62/781,432, filed Dec. 18, 2018, titled "CONTEXT AIDED VISUAL SEARCH." The entire contents of each afore-listed earlier-filed applications are hereby incorporated by reference for all purposes.

BACKGROUND

1. Field

The present disclosure relates generally to computer vision and, more specifically, to context aided visual search and multi-channel computer-vision object recognition.

2. Description of the Related Art

A surprising discovery by artificial intelligence researchers is that many types of high-level reasoning require relatively few computational resources, while relatively low-level sensorimotor activities require relatively extensive computational resources. In many cases, the skills of a child are exceedingly difficult to implement with a computer, while the added abilities of an adult are relatively straightforward. A canonical example is that of computer vision, where it is relatively simple for a human to parse visual scenes and extract information, while computers struggle with this task.

Notwithstanding these challenges, computer vision algorithms have improved tremendously in recent years, particularly in the realm of object detection and localization within various types of images, such as two-dimensional images, depth images, stereoscopic images, and various forms of video. Variants include unsupervised and supervised computer vision algorithms, with the latter often drawing upon training sets in which objects in images are labeled. In many cases, trained computer-vision models ingest an image, detect an object from among an ontology of objects in the image, and indicate a bounding area in pixel coordinates of the object along with a confidence score.

SUMMARY

The following is a non-exhaustive listing of some aspects of the present techniques. These and other aspects are described in the following disclosure.

Some aspects include a process including: obtaining, with a computer system, an image depicting an object within a context, wherein: the image is captured by a mobile computing device, the object is a member of an ontology of objects including a plurality of objects, and the context is a member of an ontology of contexts including a plurality of contexts; determining, with the computer system, with a trained context classification model, the context depicted by the image; determining, with the computer system, with a trained object recognition model, a first object identifier of the object based on the image and the context; and causing, with the computer system, the first object identifier of the object to be stored in memory.

Some aspects also include a process including: obtaining, with a computer system, (i) an image captured by a mobile computing device and (ii) coordinates indicating an input location of an input detected on a display screen of the mobile computing device, wherein: the input caused the image to be captured, the input location is a location in pixel-space of the image, and the image depicts a first object located at a first location in the image; obtaining, with the computer system, a computer-vision object recognition model trained using a training data set including images depicting objects, wherein: each image of the training data set is labeled with an object identifier, each object identifier indicates an object in an object ontology depicted by a corresponding image, and the object ontology includes the first object; detecting, with the computer system, with the computer-vision object recognition model, the first object based on: a first distance in a feature space of the computer-vision object recognition model between an image feature vector of the image and a first feature vector of the first object in the computer-vision object recognition model; and a first distance in the pixel-space of the image between the input location of the input and the first location of the first object; and causing, with the computer system, a first object identifier of the first object from the object ontology to be stored in memory.

Some aspects include a tangible, non-transitory, machine-readable medium storing instructions that when executed by a data processing apparatus cause the data processing apparatus to perform operations including each of the above-mentioned processes.

Some aspects include a system, including: one or more processors; and memory storing instructions that when executed by the processors cause the processors to effectuate operations of each the above-mentioned processes.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
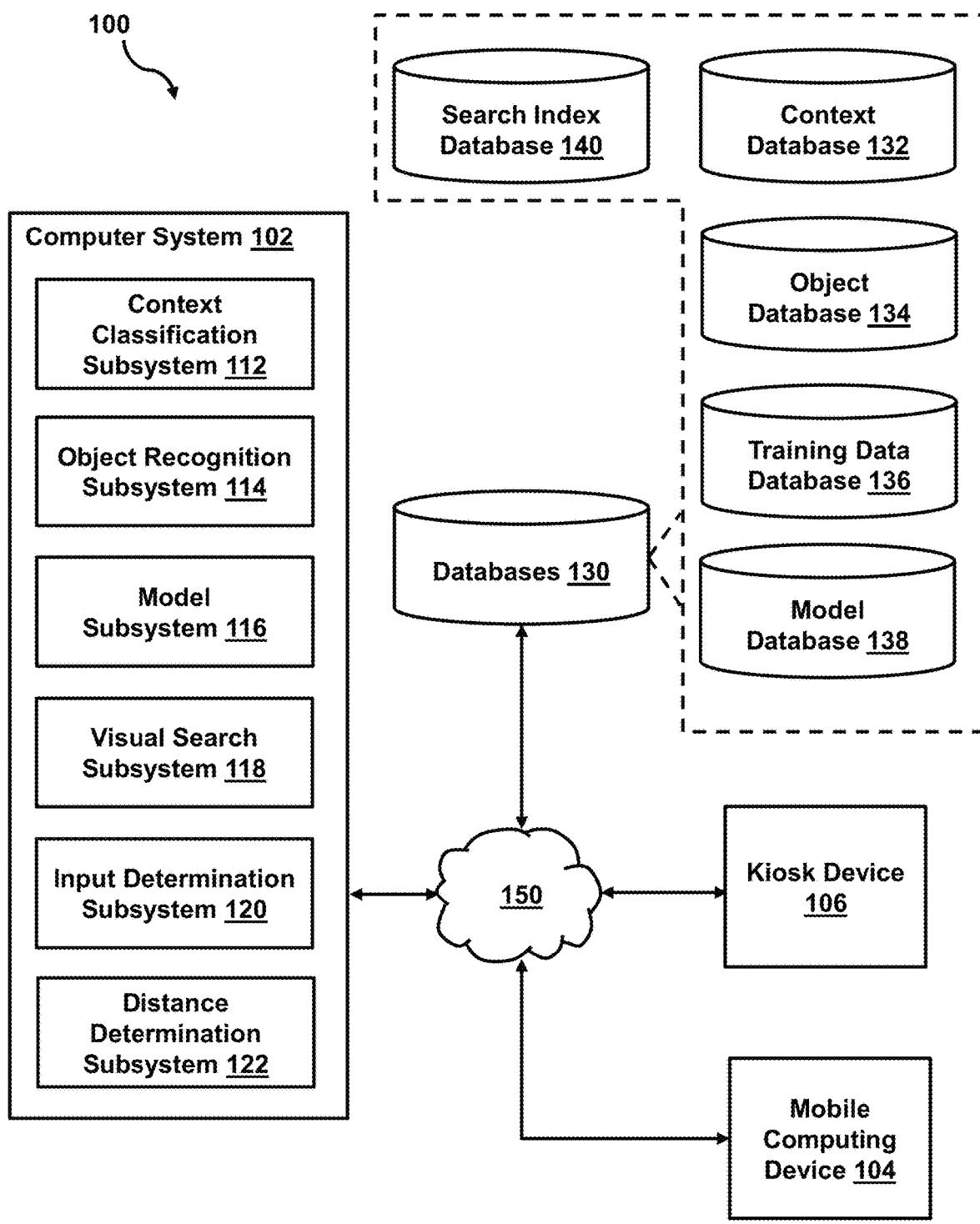
FIG. 1 illustrates an example system for recognizing an object depicted within an image, in accordance with various embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of computer vision. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Context-Aided Visual Search

Many existing computer-vision object detection and localization approaches require larger training sets than are available for some use cases. Many examples are trained with sets of images including tens of thousands of images of each object the model is capable of detecting. Various approaches have been developed for use cases with smaller sets of training images, while candidate objects in an ontology are relatively large. For example, some training data sets may include less than 100 example images of each object, less than 10 example images of each object, or even a single image of each object, while the number of object in the ontology may be more than 1,000, more than 10,000, more than 100,000, or more than 1,000,000. But many of these techniques (e.g., including smaller sets of training images) are less accurate and more computationally expensive than desirable. Or in some cases, ratios of any permutation of these numbers may characterize a relevant scenario. For example, a ratio of example images per object to objects in an ontology of less than 1/100; 1/1,000; 1/10,000; or 1/100,000. Further, many approaches become particularly computationally expensive as more complex convolutional layers are added to models and as the size of an ontology of objects being detected grows.

Some embodiments augment computer-vision object detection by enriching a feature set by which objects are detected with a classification of a context in which the objects appear in an image. Examples include models that upweight kitchen utensils in response to classifying an image as depicting a scene in a kitchen as the image context, or upweight home improvement equipment in response to classifying an image as depicting a scene in a garage as the image context.

In some embodiments, an object recognition model may be positioned downstream from a context classification model in an image processing pipeline. The context classification model may receive an image and output a context classification vector indicative of a confidence that the image depicts a particular context. Some examples of context include scenes, temporal information, geographical information, input information, and the like. In some embodiments, the context classification model may be a scene classification model that receives an image and outputs a scene classification vector indicative of a confidence that the image depicts a particular scene. This scene classification vector may be input to the object recognition model as an enriched feature set along with the corresponding image itself for which objects are to be detected. Some embodiments may classify scenes according to various exclusive or non-exclusive attributes. For example, exclusive attributes may indicate whether an image depicts a scene that is indoors or outdoors, while non-exclusive attributes may classify the scene as a living room decorated for a holiday. The output from the scene classification model may be passed to an object recognition model along with the image for which the scene was classified.

In some embodiments, the object recognition model is trained to recognize (e.g., classify and locate) objects in an ontology of objects, only a small (e.g., less than 0.1%) subset of which may appear in any given image in some cases. Each object in the ontology may have associated therewith a context vector having dimensions indicative of a correlation of that object with a respective context classification (e.g., in the same taxonomy (or other ontology) as is applied by the scene classification model). In some cases, the object recognition model may be trained on a training data set in which both objects depicted are labeled and scenes are labeled according to the context (e.g., scene) ontology or taxonomy, such that the object recognition model is responsive to both pixel values and context classifications when recognizing objects.

In some cases, the context classification model is separately trained from the object recognition model. For example, the context classification model may be trained in a distinct training operation in which a distinct objective function is optimized that differs from the object function to be optimized during training of the object recognition model. As another example, the context classification model may be trained using a different labeled training set of images than that of the object recognition model. The context classification model and the object recognition model may then be combined further down the pipeline of models for classification. Or in some cases, the object recognition model and the context classification model are jointly optimized.

In some embodiments, the context of an image may be identified using metadata obtained with the image. For example, the obtained metadata may include geographic information, ambient lighting information, directionality information, etc. For instance, the metadata may be obtained from geo-positional sensors, motion sensors, ambient light sensors, and other sensors located on a mobile computing device used to capture an image, in communication with the mobile computing device, or a combination thereof. As an example, global positioning data may be used to identify and confirm whether a background of an image includes snow (e.g., by determining a geographical position of the mobile computing device and determining whether that geographical region experienced snowfall recently). If so, this may indicate that it is likely wintertime, and so a vertical of clothing with a focus on winter coats or winter products may be more relevant form a search perspective. Thus, the vertical of clothing with a focus on winter coats or winter products may be upweighted when performing a visual search for an object detected within the image. In some embodiments, metadata may be generated to reflect the context of the image. For example, if an image is taken in a kitchen, then there is a higher likelihood that the item to be searched for is a kitchen-related item. In some embodiments, labels indicative of the context may be obtained and used to either (1) restrict a search to be narrowed to items only related to the identified context's label, or (2) apply a weight to the search to weigh items related to the identified context's label greater than items not related to the identified context's label. The weighting may be accomplished by adding an additional dimension to the feature space or by attaching a multiplier to the distance of certain items.

In some embodiments, upon receiving an image, objects and regions of interests (ROIs) may be detected from the image. The objects and ROIs may be run through a first set of classifiers to identify characteristics such as, but not limited to, pattern, color, material, category, vertical, logo, etc. The information obtained from the first set of classifiers may be provided with the ROIs to a deep learning model to extract a set of features for a given ROI. The information from the first set of classifiers may be used to supplement the features searched against the database of items. The entire image may be used to classify context and then the classified context of the image may be used for identifying additional labels associated with each ROI detected in the image. In some embodiments, after using the context to identify labels associated with each ROI, a weighted or narrowing search against an object database of items may be performed to identify an object or objects that match the features of the ROI(s) based on the extracted context.

In some embodiments, the system may loop back and use the identified objects from the ROI to further refine the context information. In other words, after identifying the object(s) from the search and the context of the original image, the model can go back and use the images for refining the classifiers for the explicit categories to better understand the aspects that encompass different contexts.

In some embodiments, a context classification model, such as a scene classification model, may be a unified ontology of retail, where retail can encompass various items, products, or services that are searchable and capable of being obtained (e.g., purchased). In some examples, a scene classification model may be configured to identify (e.g., classify or otherwise determine) a vertical to which an image relates. For example, a scene classification model may identify whether an image is related to a fashion vertical, food/beverage vertical, financial vertical, media vertical, technology vertical, etc., based on the scene classified as being depicted by the image. Based on the identified vertical, different attributes (e.g., scores for dimensions) may be added to a feature vector (e.g., increasing its dimensionality) for an object recognition model, or different extant attributes of the feature vector may be weighted based on the vertical (e.g., by scaling the size of various scalars). For example, if (e.g., in response to determining that) an image is identified as being part of the home improvement vertical, then attributes associated with home improvement products, such as saws, drills, hammers, etc., may be added to a feature vector for classifying objects within the image, or the attributes may be upweighted in the object recognition model. In some embodiments, attributes that are not associated with the vertical may be removed from the feature vector or down-weighted. Continuing the previous example, attributes associated with food products may be removed from a feature vector for classifying objects within the image if the image was identified as being part of the home improvement vertical, or attributes associated with food products may be down-weighted in the object recognition model. As another example, in the home improvement vertical, certain features may be irrelevant or have less importance for classifying an object (e.g., pattern), whereas if the scene classification model identified the vertical as being the fashion vertical, then such features may be more relevant for object classification.

In some embodiments, the object recognition model following the context classification model may recognize (e.g., classify, locate, etc.) objects in an ontology of objects that includes cross-reference information connecting objects of one hierarchy to objects in another hierarchy (e.g., in a knowledge graph). For example, if a scene classification model identifies that an image has a garage background and includes a hammer, the scene classification model may access the knowledge graph, select adjacent nodes to hammer having edges indicating complements, and determine that nails are connected to hammers. Some embodiments may increase a weight in the object recognition model for a feature or features related to nails. In some embodiments, a graph may be built from objects detected using a scene classification model, the object recognition model, or both, as a series of single purpose rules. In some embodiments, the graph may be built by extracting information from previously obtained data. For example, a retailer may provide a product catalog that includes product information such as name, description, category, etc., and some embodiments may extract node identifiers and relationship edges for a knowledge graph based on natural language text in the catalog. The graph may even further be enhanced by obtaining information related to a product available through publicly accessible resources, such as the Internet. For instance, some embodiments may crawl Wikipedia or other websites and determine relationships based on term-frequency inverse document frequency (TF-IDF) (e.g., BM25) scores and co-occurrence rates in webpages of terms relating to the nodes, for example by detecting that hammer and nail tend to co-occur, for instance with relationships determined based on (e.g., for those with less than a threshold) distance determined with latent semantic analysis or word2vec (e.g., cosine distance, Minkowski distance, Euclidian distance, or the like). Or these techniques may be applied to co-occurrence of objects in images (e.g., hammers occurring frequently in images with nails and rarely in images without nails may cause embodiments to add an edge to a knowledge graph between a node representing a hammer and a node representing a nail). The graph therefore may be built to include various available information relating to a particular product. When an image is captured and an object or pair of objects is/are identified therein, a likely context for that image may be determined, and the search space for that object may be narrowed or portions of the search space may be more heavily weighted. As an example, if an image of a slice of pizza is captured, the slice of pizza may be identified using the object recognition model. To recommend products to a user, the context may be used to determine that providing products related to purchasing a slice of pizza are less optimal (e.g., because the user already has a slice of pizza), as opposed to information like a food blog, nutritional information, recipes, etc. Using the contextual information surrounding the captured image, the connected features may be used to curate the decisions, recommendations, and actions provided to a user to enhance user experiences.

Tap-to-Search

Existing computer-vision object recognition and localization approaches often fail to align with user-intent when processing an image. In some cases, this is because an image depicts many objects and there is no clear indication of which one prompted the user to select (e.g., capture) the image. And in some cases, such processes suffer from lower accuracy and are more computationally expensive than desirable. Various phenomena contribute to errors, including, but not limited to, blurring, irrelevant objects in a camera's field of view (FOV), novel camera poses relative to a training data set, suboptimal lighting in run-time images, etc. These issues are compounded by many of the aforementioned issues with respect to training data set sizes being limited while object ontology being large.

To mitigate some of the above-described problems, some embodiments may leverage an additional channel of information beyond the image itself to improve object detection, object recognition, object selection, or any combination thereof. Some embodiments may use input information, such as touch location or eye gaze location, to reduce the search space of an image (or modulate the amount of computational effort expended in different areas of the image) when detecting objects therein or inferring user intent from images with multiple objects. Some embodiments may determine whether (and in some cases where) objects appears in an image based on a location of a detected input from a user on a displayed user interface, like a touch screen, an eye gaze sensor, or a pointer in an augmented reality or virtual reality interface. Additionally, or alternatively, some embodiments may select an object among such objects depicted within an image based on a location of the detected input. This is expected to accommodate use of less robust object recognition models based on smaller training sets than versions of such models trained on larger training sets, as the set of inputs may be constrained by the added channel, and in some cases, the search space may be reduced by narrowing which pixels in an image are pertinent to a search. For instance, noise from objects at the periphery of a touch location may be discarded based on the touch location.

In some embodiments, a user may open a search application on their user device to search for information related to an item, like an object that may appear in an image. The application (like a native application on a mobile computing device) may cause a camera on the mobile computing device to sense an image in a field of view (FOV) of the camera (or set of cameras in systems implementing computational photography) and display the image (e.g., a single image or video) sensed by the camera in a user interface (UI) of the application.

In some embodiments, a user may tap (or otherwise select pixel coordinates) on the display screen that displays the UI to cause an image representing the displayed contents to be captured. In some cases, the input may generate a UI event, like an on-touch event, a touch-release event, a draw-circle event, or the like, and the event may include various parameters, like pixel coordinates. In some cases, a coordinate location of where the input was detected on the display screen may also be obtained. Some embodiments may execute an event handler that receives this event and causes responsive actions, like storing the image displayed while the event was received in memory and associating the image with the event in memory.

In some embodiments, the captured image (or set of images, such as those in a video preceding or following (or both) a frame in which the event occurred) and the coordinate location (or other parameters of the UI event) may be provided to a computer-vision object recognition system (which in some cases, may be an object detection and localization system). The object recognition system, which may include or use an object recognition model, may output a score for an object in an ontology of objects indicative of a confidence level that the object was recognized (e.g., the object was detected in the image, the object was selected, or both, where selection indicates that the selected object accords with the user's intent). Some embodiments may output such scores for each of a plurality of objects in an object ontology (e.g., in an object detection vector) and, in some cases, bounding polygons (with vertices expressed in pixel coordinates) of each object. For example, a feature vector may be generated from an input image, where dimensions correspond to features (like edges, blobs, corners, colors, and the like) in the input image. The feature vector may be input into a discriminative computer vision object recognition model, which may match the feature vector to a closest feature vector of an object in a labeled training set of images. Some embodiments may select an object having a highest score based on such a distance (e.g., upon determining the distance is greater than a threshold) as the object in the image. In some embodiments, the score may be used to select an object to be searched for (e.g., against a product catalog or object database). In some embodiments, data associated with the detected event may be used as training data for training an object recognition model to perform object recognition.

In some embodiments, multiple inputs may be detected. For example, two taps on a display screen at two different locations may indicate two different searches to be performed. As another example, a multiple-tap gesture (or pinch gesture or circle event) may indicate a boundary polygon (e.g., box) of an item or items to be searched. As still another example, a front-facing camera may be employed to detect eye gaze, which may also be used to determine an object of interest of the user. In some cases, a user may place an object, like their hand, in a field of view of the camera capturing the image in which objects are to be detected, and the user-placed object may indicate pixel coordinates. For example, by sticking out one's arm and pointing at an object within the field of view of the camera, the hand may appear in the image being processed. In some embodiments, human pose estimation may also be used to determine an object of interest of a user. For example, the OpenPose architecture may be used to identify, from an image, different portions of a human body (e.g., a hand, a face, a leg, etc.), and a determination may be made as to whether the identified portions are directed towards an object depicted within the image.

The image displayed on the UI may include an object or objects with which the user would like to search for and obtain information. In some embodiments, the UI may not include an explicit image capture button. In other words, the entire UI may display the contents viewed by the camera, and no capture image button physically or virtually may be available. In some embodiments, multiple objects may be recognized as being present within the input image, and the coordinate location of the user input (e.g., tap input) may be used to select one of the objects as being reflective of the user's intent based on the location of the user input in pixel coordinates (e.g., selecting the object having a centroid with a closest location to the touch location in pixel coordinates. In some embodiments, a distance from an input's coordinate location with respect to one or more bounding boxes may serve as an additional input for determining an object of interest for the user.

In some embodiments, a visual search system may obtain the image and coordinate location information. The visual search system may extract features from the image and determine, based on locations of objects depicted by the image and the coordinate location information, a likely object (or other type of object) of interest for which the user is searching. Each object detected within the image may be reverse weighted with respect to the coordinate location information, and the object that is most proximate to the coordinate location information may be selected as the likely object of interest. For example, scores of an object recognition model may be adjusted based on the reverse weighting such that a first object for which the model indicates a lower confidence (indicated by a lower) score is selected over a second object with a higher confidence based on the first object being depicted in the image closer to the touch location than the second object (e.g., by multiplying the score by the reverse weighting).

Information about the object may be retrieved by the visual search system and may be provided to the computing device with which the input was detected. For instance, embodiments may access an index keyed to object identifiers (e.g., stock keeping units (SKUs)), and may retrieve and present records related to the object, including a URL of a merchant's website at which the object can be purchased, descriptions of products corresponding to the object, related objects, reviews, and the like. Identifiers of detected objects may be used to a variety of ends, including input to queries in search applications (like product recommendation application), selection of items in augmented reality interfaces, and selections of items for language translation applications that return a name of objects in an image.

In some embodiments, tap point information (or coordinates of other forms of user input) may be used to enhance or selectively process an image prior to being provided to a server. For instance, enhancement may be performed on-device (e.g., on a computing device) to a portion of an image centralized around the tap point. Such enhancements may include light balance enhancement and shadow removal (e.g., embodiments may transform an image in a raw file format (having a relatively wide color gamut) into a file format in a positive file format (having a narrower color gamut), and tradeoffs in white balance, intensity, and other pixel values may be made to favor areas of an image near (e.g., within a threshold distance of, like less than 10%, less than 20%, or less than 50% of an images width in pixels) a touch location. Additionally, patterns and colors may be detected within a region of the image where the tap point is located, which may be used to select an object from an object ontology. In some embodiments, the enhancement or other form of processing may be performed additionally or alternatively by server-side operations of a search system. This may balance the tradeoff between reducing the processing time associated with server side image processing and latency issues associated with transmitting high-quality images to the server.

In some embodiments, the coordinate location of a tap point may be used to compress portions of an image non-proximate to the coordinate location. For example, an image may be segmented into portions (e.g., blocks), and portions further than a threshold distance (like those examples above) from the tap point may be compressed with a first amount of loss, while the portions proximate the tap point may be compressed with a second (e.g., smaller or zero) amount of loss. In some embodiments, the quantization matrices for the compression algorithm may be changed for different portions of the image, which may address file size issues that can increase latency.

For example, in some embodiments, images may be adjusted within the image to reduce bandwidth and memory usage relatively to implementations that naively upload all captured images. Some embodiments may crop images to exclude portions not depicting the object adjacent a tap point or further than a threshold distance from a tap point or other coordinate of user input on a screen (e.g., outside a bounding box of the object in question). Some embodiments may modulate image compression within a frame based on the location of an object. For instance, some embodiments may compress images with a lossy compression algorithm (like JPEG, etc.), and the amount of data loss within different areas of the frame may be modulated such that areas of an image within a threshold distance of a tap point or detected object corresponding thereto (like where the object is detected based on a tap point) have less loss of data (and thus lower compression ratios) while areas not depicting the object or further from the tap point have greater loss of data (and thus higher compression ratios). For example, some embodiments may select different quantization matrices for different areas (e.g., square blocks in a tiling) of an image to modulate data loss/compression (e.g., before dividing a discrete cosine transform coefficient matrix by the quantization matrix in an element-by-element division and rounding to the nearest integer), such that larger values in the quantization matrix tend to result in zero values in the result, and more prevalent use of larger values corresponding to higher frequency components tend to increase compression ratios, thereby increasing efficiency of subsequent run-length encoding of the result. By conserving processing capabilities to only a portion of the image surrounding the tap point and not the entire image, the local processing power may be conserved for only the portion of the image identified as being of interest.

In some embodiments, aspects of a visual search may be executed on client-side (e.g., on a mobile computing device), such as the bounding box proposal aspect of an object detector. For instance, the visual search system may detect the presence of an object within a bounding box, but may not be able to identify the object. In some embodiments, after placing the bounding box around a detected object, computational enhancement techniques may be applied to improve the quality of the portion of the image including the bounding box (e.g., contours, color schemes). Furthermore, the distance from the tap point's coordinate location to a centroid of the bounding box may be computed, and the bounding box may be extended.

As mentioned above, a compressed image may initially be sent to a server for initial processing. In some embodiments, one or more additional images may be obtained in the background, either spatially or temporally, and these images may subsequently be provided to the server as part of the same image processing job as that of the initially provided (compressed) image. By doing so, different objects, backgrounds, contexts, and visualization aspects (e.g., lighting, angle, etc.) may be analyzed in parallel processing with the initially sent image. As an example, an initial image sent to the server may be analyzed to identify a candidate object or objects depicted within a portion of the image surrounding a tap point (a term used generally herein and which should be read as also disclosing coordinates on a display or image corresponding to the other types of user input mentioned). As the initial image is processed, one or more background images may also be captured and provided to the server, and information associated with the background may be used to refine and clarify the candidate item or items that possible were detected in portion of the image surrounding the tap point (e.g., scene classification information indicating a scene within the image).

On the client-side (e.g., on a mobile computing device), object tracking associated with a coordinate location of a tap point may be used to obtain depth information associated with an object. In some embodiments, an object depicted within an image displayed by the UI may be tapped, and in response to the input, a search anchor may be attached to the object in a 3D virtual space. Subsequent movements of the mobile computing device, the object, or both, may be detected and depth information indicated the relative distance from the object to the mobile computing device may be determined on the mobile computing device to provide a relatively low-latency augmented reality display based on the depth information.

Furthermore, in some embodiments a scene graph may be generated to connect contextual information and a detected object to resolve an identity of the object. For example, if an object detected in a background of an image is a stove or microwave, and the object detected proximate to the tap point is identified as possibly being a fork, then this may indicate that the contextual information indicates that a user is likely in a kitchen. Similarly, if a hammer is detected in a same image as other home improvement images (e.g., a drill, saw, etc.) then this may indicate an increased likelihood that the user is currently in a garage. The scene graph may encompass this information to describe the scene with which the image is captured, which may further help in object identification, product recommendation, and contextual analysis.

FIG. 1 illustrates an example system for recognizing an object depicted within an image, in accordance with various embodiments. In some embodiments, system 100 may include a computer system 102, a mobile computing device 104, a kiosk device 106, databases 130, and other components, each of which may be configured to communicate with one another via one or more networks 150 (e.g., the Internet, an Intranet, etc.). In some embodiments, computer system 102 may be a mobile computing device, which is the same or similar to mobile computing device 104, however computer system 102 may also refer to a server-side system that receives data from one or more devices (e.g., mobile computing device 104, kiosk device 106), and outputs data to the devices. Although a single instance of kiosk device 106 and mobile computing device 104 is included by system 100, additional instances of kiosk device 106 and mobile computing device 104 may be present, and are not illustrate so as to simplify the depicted system components. Further still, while only a single computer system 102 is illustrated, the functionality of computer system 102 may be replicated on multiple instances of computer system 102, shared across such instances of mobile computer system 102, distributed across multiple instances of computer system 102, and the like.

In some embodiments, computer system 102 may include a context classification subsystem 112, an object recognition subsystem 114, a model subsystem 116, a visual search subsystem 118, an input determination subsystem 120, a distance determination subsystem 122, and other components. As mentioned above, some or all of the aforementioned subsystems (e.g., subsystems 112-122) may be offloaded to a mobile computing device (e.g., mobile computing device 104), computer system 102 may be a mobile computing device, or both. Therefore, while the functionalities of each subsystem may be described in the context of being performed client-side or server-side, the functionalities of these subsystems are not restricted to be performed only client-side or only server-side.

In some embodiments, context classification subsystem 112 may be configured to classify a context of an image based on a context classification model. As described herein, a context of an image may include, but is not limited to, a scene depicted by an image, geographical information regarding where an image was captured (e.g., from one or more location sensors resident on a device used to capture the image), temporal information indicating a time that an image was captured, input information regarding inputs detected by a device used to capture an image, user information related to a user operating a device used to capture the image, and so on. In some embodiments, scene classification may refer to a process whereby objects depicted by an image, the layout of those objects within the image, and ambient contextual information, are used to determine a scene of an image. A "scene," as defined herein, may refer to a view of a real-world environment that includes multiple surfaces and objects, which may be organized in a meaningful way. A scene may represent one type of context, and may refer to a physical place (e.g., a geographical location, such as a landmark, address, point of interest, etc.), a type of place (e.g., a home, a school, an office, etc.), a sub-type of place (e.g., a bedroom within a home, a garage of a home, a classroom within a school, etc.), background information (e.g., trees, snow, bodies of water), or any other information, or any combination thereof. For example, context classification subsystem 112 may be configured to determine, based on an input image and a scene classification model, that the image depicts a snow-covered field.

In some embodiments, context classification subsystem 112 may be configured to classify an image as including, describing, being related to, or a combination thereof, a context or contexts of a context ontology including a plurality of contexts. For example, a context ontology may include a scene ontology, a geographical ontology, a season ontology, and so on. In some embodiments, a scene classification model may refer to a genre of context classification models configured to classify an image as depicting a scene from a scene ontology including a plurality of scenes, each scene from the scene ontology being labeled with a scene identifier of the scene. As described below, with respect to model subsystem 116 and training subsystem 120, a context classification model may be trained to classify an input image as depicting a context from the context ontology using a training data set including a plurality of images including different contexts. In some embodiments, context database 132 may include different contexts with which an image may be classified. For example, context database 132 may include different scenes that an image may be classified as depicting.

In some embodiments, context classification subsystem 112 may obtain a trained context classification model, such as a trained scene classification model, from model database 138. The scene classification model may be a convolutional neural network (CNN) including a plurality of layers (e.g., 4 or more layers, 5 or more layers, 6 or more layers, 8 or more layers, etc.), which may form a portion of a deep neural network for classifying, or recognizing, a scene. In some embodiments, the CNN may include, in addition to the plurality of convolutional layers, a number of batch normalization layers, a number of ReLU layers, a number of max-pooling layers, one or more fully-connected layers, and one or more Softmax layers. One example of a CNN used to perform automatic scene classification is AlexNet. The AlexNet architecture includes five convolutional layers and three fully connected layers, and a Softmax layer following the last fully connected layer to output a classification distribution, with a ReLU non-linearity applied to the output of every convolutional layer and every fully connected layer. However, the scene classification model used by context classification subsystem 112 may include a same, fewer, or more convolutional layers and fully connected layers. In some embodiments, the kernels may be grouped together as residual blocks, and the kernels may be 1×1, 3×3, 5×5, or other sizes.

In some embodiments, context classification subsystem 112 may output a classification vector including weights representative of the contexts determined for a given input image based on the context classification model. In some embodiments, the classification vector may upweight (e.g., if all weights are initialized to zero) features of the classification vector that were determined to be represented by the image. For example, an image depicting a snow-covered field may have a vector element associated with winter scenes upweighted (e.g., to a non-zero positive value), whereas a vector element associated with a desert or a beach may remain at its initialized value (e.g., zero). In some embodiments, additional features may be added to a feature vector for object recognition based on the contexts identified by context classification subsystem 112.

In some embodiments, context classification subsystem 112 may receive an image and output a context classification vector indicative of a confidence that the image depicts a particular context. For example, an image captured by an image capture component (e.g., a camera) of computer system 102, mobile computing device 104, or kiosk device 106 may be provided to context classification subsystem 112. Upon receiving the image, context classification subsystem 112 may retrieve a context classification model from model database 138 (e.g., a scene classification model), input the image to the context classification model, and obtain an output from the context classification model of a context classification vector. For instance, context classification subsystem 112 may use a scene classification model to output a context classification vector indicative of a confidence that the image depicts a particular scene. This context classification vector, or a portion of that vector associated with the scene (e.g., a scene classification vector), may be input to an object recognition model as an enriched feature set along with the corresponding image itself for which objects are to be detected.

In some embodiments, context classification subsystem 112 may be configured to receive object identifiers of objects depicted within an image by object recognition subsystem 114, which may serve, with the classified context vector, as inputs to the context classification model to determine whether the identified context should be updated. For example, a scene classification model may determine a scene of an image, which may be provided to object recognition subsystem 114. Based on the scene and the image, one or more objects may be recognized within the image. The image, the identified objects, and the initial scene may then be provided back to context classification subsystem 112 to determine whether the scene was correctly classified, and, if not, a new scene to classify the image as depicting based on the objects. As an example, initially, a scene classification model may classify an image as depicting a winter scene, and may assign a winter classification label to the image. The winter classification label and the image may be provided to an object recognition model, which may determine, based on the winter classification label and the image, that a tree is depicted within the image and may assign a tree identification label to the image. Subsequently, the tree identification label, the winter classification label, and the image may be provided back to the scene classification model. The scene classification model may then determine, based on the winter classification label, the tree identification label, and the image, that the image depicts a winter holiday scene, and may update the image with a winter holiday scene classification label.

In some embodiments, object recognition subsystem 114 may be configured to recognize one or more objects depicted within an image. Object recognition subsystem 114 may obtain the image to be analyzed from mobile computing device 104 or kiosk device 106, or alternatively, the image may be captured by a camera or other image capture component of computer system 102. In some embodiments, the image as well as a context classification vector may be obtained by object recognition subsystem 114 for performing object recognition. For example, a scene classification vector output from context classification subsystem 112 may be obtained with an image depicting one or more objects, both of which may serve as inputs for object recognition subsystem 114.

In some embodiments, object recognition subsystem 114 may retrieve an object recognition model from model database 138. The object recognition model may be a trained object recognition model trained using a training data set of objects from an object ontology, such as an object ontology stored in object database 134. Each object from the object ontology may be labeled with an object identifier of a corresponding object. In some embodiments, the object recognition model may be a convolutional neural network (CNN) including a plurality of convolutional layers, one or more fully connected layers, one or more non-linearity layers, and one or more pooling layers. The object recognition model may receive an input image, and some embodiments may also include receiving a context classification vector (e.g., a scene classification vector), which may serve as inputs to the object recognition model. The output of the object recognition model may be one or more object identifiers indicating objects recognized as being present within a given image. In some embodiments, outputs from object recognition subsystem 114 may be provided to context classification subsystem 112 for determining a confidence level of the previously identified context responsive to the object(s) identified within the image, and if the confidence level is less than a confidence threshold level (e.g., less than 75%, less than 80%, less than 90%, etc.) then context classification subsystem 112 may be configured to recompute a context of the image using the initial context, the image, and the identified object identifier(s) as inputs. For example, initially a scene classification model may classify an image as depicting a winter scene, and may assign a winter classification label to the image with a first confidence level (e.g., a confidence score). The winter classification label and the image may be provided to an object recognition model, which may determine, based on the winter classification label and the image, that a tree is depicted within the image and may assign a tree identification label to the image with a second confidence level (e.g., a confidence score). Subsequently, the tree identification label, the winter classification label, the first and second confidence levels, and the image may be provided back to the scene classification model. The scene classification model may determine that the confidence level assigned to the scene (e.g., winter classification label) is less than a threshold value, and therefore may analyze the image again to determine if an updated scene for the image may be determined. Therefore, based on the winter classification label, the tree identification label, and the image, the scene classification model may determine the image depicts a winter holiday scene with a higher confidence level than the initial confidence level for the scene, and may update the image with a winter holiday scene classification label.

In some embodiments, object recognition subsystem 114 may be configured to detect the presence of one or more additional objects within an image based on an object recognized within the image. For instance, the output of a computer-vision object recognition model may be provided as reference feedback to determine whether any other objects are depicted by the image. For example, an object recognition model may determine that an image depicts a first object with a first confidence level, and a second object with a second confidence level. If the first confidence level exceeds a threshold confidence level, then the object recognition model may assign a first object identifier of the first object from an object ontology to the recognized first object. However, if the second confidence level is less than the threshold confidence level, then the object recognition model may not assign an object identifier to the second object. In this example, the first object identifier, the image, and a context classification vector (e.g., the context of the image determined by a context classification model), may be looped back into the object recognition model to determine, based on the new inputs, whether the second object can be identified. If so, the object identifier for the second object may then be assigned to the second object.

In some embodiments, one or more post-image analysis processes may be performed to the image to enhance the image and perform additional, or subsequent, object recognition analysis to the enhanced image. For example, if an image is determined to include a first object at a first location within the image, the image may be cropped about a region of interest (ROI) centered about the first location, the region of interest may have its resolution, clarity, or prominence increased, or portions of the image not included within the region of interest may be compressed or otherwise have their resolution downscaled. The enhanced may then be provided as an input to the object recognition model to determine whether a second (or other) object is recognized within the enhanced image, and if so, an object identifier of the second object may be assigned to the second object.

In some embodiments, context classification subsystem 112 and object recognition subsystem 114 may extract visual features describing an image to determine a context of the image and objects depicted by the image. In some embodiments, the process of extracting features from an image represents a technique for reducing the dimensionality of an image, which may allow for simplified and expedited processing of the image, such as in the case of object recognition. An example of this concept is an N×M pixel red-blue-green (RBG) image being reduced from NxMx3 features to NxM features using a mean pixel value process of each pixel in the image from all three-color channels. Another example feature extraction process is edge feature detection. In some embodiments, a Prewitt kernel or a Sobel kernel may be applied to an image to extract edge features. In some embodiments, edge features may be extracted using feature descriptors, such as a histogram of oriented gradients (HOG) descriptor, a scale invariant feature transform (SIFT) descriptor, or a speeded-up robust feature (SURF) description.

In some embodiments, the feature extraction process may use deep learning processing to extract features from an image. For example, a deep convolution neural network (CNN), trained on a large set of training data (e.g., the AlexNet architecture, which includes 5 convolutional layers and 3 fully connected layers, trained using the ImageNet dataset) may be used to extract features from an image. In some embodiments, to perform feature extraction, context classification subsystem 112 and object recognition subsystem 112 may obtain a pre-trained machine learning model from model database 138, which may be used for performing feature extraction for images from a set of images provided to computer system 102. In some embodiments, a support vector machine (SVM) may be trained with a training data to obtain a trained model for performing feature extraction. In some embodiments, a classifier may be trained using extracted features from an earlier layer of the machine learning model. In some embodiments, preprocessing may be performed to an input image prior to the feature extraction being performed. For example, preprocessing may include resizing, normalizing, cropping, etc., to each image to allow that image to serve as an input to the pre-trained model. Example pre-trained networks may include AlexNet, GoogLeNet, MobileNet-v2, and others. The preprocessing input images may be fed to the pre-trained model, which may extract features, and those features may then be used to train a classifier (e.g., SVM). In some embodiments, the input images, the features extracted from each of the input images, an identifier labeling each of the input image, or any other aspect capable of being used to describe each input image, or a combination thereof, may be stored in memory (e.g., within training data database 136 as an update to training data set for training an object recognition model, a context classification model, etc.). In some embodiments, a feature vector describing visual features extracted from an image may be output from context classification subsystem 112 and object recognition subsystem 114, which may describe one or more contexts of the image and one or more objects determined to be depicted by the image. In some embodiments, the feature vector, the input image, or both, may be used as an input to a visual search system (e.g., visual search subsystem 124) for performing a visual search to obtain information related to objects depicted within the image (e.g., products that a user may purchase).

In some embodiments, model subsystem 116 may be configured to retrieve models stored within model database 138, provide the retrieved models to one or more subsystems for analyzing an image or set of images (e.g., to context classification subsystem 112, object recognition subsystem 114, etc.), as well as to train one or more models and generate training data for training the one or more models. For example, model subsystem 116 may be configured to train a context classification model to be used by context classification subsystem 112, an object recognition model to be used by object recognition subsystem 114, and the like. In some embodiments, model subsystem 116 may build or assist in the build of a given model.

In some embodiments, model subsystem 116 may train a context classification model based on a training data set including a plurality of images having different contexts, where each image includes a label corresponding to the context of that image. For example, the context classification model may include a scene classification model, which may be trained on a training data set including a plurality of images depicting various scenes, where each image includes a label of the scene depicted by that image. In some embodiments, the training data set may be stored in training data database 136, and model subsystem 116 may be configured to retrieve the training data set for training the context classification model. However, some embodiments may also include model subsystem 116 generating the training data set by obtaining images labeled with different contexts from context database 132. For instance, context database 132 may include various sets of images, where each set of images is related to a context (e.g., a scene), and may be used to train a context classification model. In some embodiments, context database 132 may include a set of images depicting various scenes, which may be used to generate training data for training a scene classification model. An example set of images depicting various scenes labeled with scene identifiers of those scenes include the Places365-Standard data set, which includes over 10 million images having over 400 different categories.

In some embodiments, model subsystem 116 may train an object recognition model based on a training set including a plurality of images depicting different objects, where each image is labeled with an object identifier of the object from an object ontology depicted by the image. In some embodiments, the computer-vision object recognition model may be generated to specifically recognize the objects depicted by the images within a training data set. For example, a propriety visual search system may train an object recognition model to recognize a particular set of objects within input images (e.g., an object recognition model trained to recognize hardware tools in images, an object recognition model trained to recognize furniture in images, a facial recognition model trained to recognize human faces in images, etc.). In some embodiments, the computer-vision object recognition model may be a deep learning network including a plurality of layers, such as a plurality of convolutional layers, a plurality of pooling layers, one or more SoftMax layers, and the like.

Some embodiments may include the trained computer-vision object recognition model having parameters that encode information about a subset of visual features of the object depicted by each image from the training data set. For example, by training the computer-vision object recognition using the training data set, weights and biases of neuron of a neural network (e.g., a convolutional neural network, a discriminative neural network, a region-based convolution neural network, a deep neural network, etc.) may be adjusted. The adjustment of the weights and biases, thus the configurations of the parameters of the object recognition model, enable the object recognition model to recognize objects within input images. For example, for a given input feature vector, generated from features extracted from an image, the model is able to identify an identifier of the object depicted by an image, where the identifier corresponds to one of the identifiers of the objects from the training data set, and a location of the object within the image. Furthermore, the subset of visual features of each object, with which the parameters are encoded with information about, is determined—for each object—based on the extracted visual features from a corresponding image depicting that object. For example, the subset of visual features may include localized gradients for edge detection of each image, a mean pixel value for a multichannel color image, and the like.

In some embodiments, the context classification model, the object recognition model, or both, may be a deep learning model, such as, and without limitation, a convolutional neural network (CNN), a region-based CNN (R-CNN), a Fast R-CNN, a Masked R-CNN, Single Shot Multibox (SSD), and a You-Only-Look-Once (YOLO) model (lists, such as this one, should not be read to require items in the list be non-overlapping, as members may include a genus or species thereof, for instance, a R-CNN is a species of CNN and a list like this one should not be read to suggest otherwise). As an example, an R-CNN may take each input image, extract region proposals, and compute features for each proposed region using a CNN. The features of each region may then be classified using a class-specific SVM, identifying the location of any objects within an image, as well as classifying those images to a class of objects.

In some embodiments, the context classification model, the object recognition model, or both, may be optimized for use on a mobile computing device. For example, the context classification mode, the object recognition model, or both, may be generated using a neural network architecture that runs efficiently on mobile computing devices (e.g., smart phones, tablet computing devices, etc.). Some examples of such neural networks include, but are not limited to Mobile-Net V1, MobileNet V2, MobileNet V3, ResNet, NASNet, EfficientNet, and others. With these neural networks, convolutional layers may be replaced by depthwise separable convolutions. For example, the depthwise separable convolution block includes a depthwise convolution layer to filter an input, followed by a pointwise (e.g., 1×1) convolution layer that combines the filtered values to obtain new features. The result is similar to that of a conventional convolutional layer but faster. Generally, neural networks running on mobile computing devices include a stack or stacks of residual blocks. Each residual blocks may include an expansion layer, a filter layer, and a compression layer. With MobileNet V2, three convolutional layers are included, a 1×1 convolution layer, a 3×3 depthwise convolution layer, and another 1×1 convolution layer. The first 1×1 convolution layer may be the expansion layer and operates to expand the number of channels in the data prior to the depthwise convolution, and is tuned with an expansion factor that determines an extent of the expansion and thus the number of channels to be output. In some examples, the expansion factor may be six, however the particular value may vary depending on the system. The second 1×1 convolution layer, the compression layer, may reduce the number of channels, and thus the amount of data, through the network. In Mobile Net V2, the compression layer includes another 1×1 kernel. Additionally, with MobileNet V2, there is a residual connection to help gradients flow through the network and connects the input to the block to the output from the block.

In some embodiments, visual search subsystem 118 may be configured to perform, or facilitate the performance of, a visual search. In some embodiments, visual search subsystem 118 may include a computer vision search system that obtain an input image, a feature vector describing the input image, object identifiers of an object or objects depicted within the image, context classifications of a context or contexts described by the image, or a combination thereof, and retrieves object information for the object(s) and context(s) of the image. For instance, visual search system 118 may access search index database 140, which stores information regarding objects (e.g., products, services, etc.). In some embodiments, search index database 140 may be organized as an index of object identifiers, context identifiers, and object information. For example, each object identifier (e.g., a SKU of a product) may be associated with an object from an object ontology, and information regarding the corresponding object identifier (e.g., a URL of a merchant website where the object can be purchased, descriptions of the object, objects that are related to that object, etc.). When an image, object identifiers, feature vectors, context classifications, a combination thereof, is provided to visual search subsystem 118, search index database 140 may be queried, and the information related to the identified objects may be retrieved and returned to visual search subsystem 118 and provided to a user.

In some embodiments, visual search subsystem 118 may generate training data for training a visual search system, and may cause the visual search system to be trained. For instance, a training data set may be generated that includes object identifiers of objects depicted within images, features extracted from images, or both. The training data set may be stored within training data database 136 and used to train the computer-vision visual search system periodically, upon request, or both.

In some embodiments, input determination subsystem 120 may be configured to determine whether an input was detected by computer system 102, mobile computing device 104, or kiosk device 106, a type of input that was detected, and an input location of the detected input. In some embodiments, different types of inputs may be detected by a computing device including, but not limited to, touch events, eye gaze events, object motion events, and the like.

Touch events may be detected by touch sensitive surfaces, and may be classified into various event types, such as, and without limitation, a touch event representing a single contact point on a touch-sensitive surface (e.g., via finger or stylus), a touch list event indicating a list of contact points on a touch-sensitive surface (e.g., multiple fingers), a touch start and touch end event (e.g., returning coordinates where a touch event begins and ends), a touch move event where one or more touch points are moved along a touch-sensitive surface, and so on. Each of these touch events may return coordinates or a set of coordinates in pixel-space of where the touch event occurred. As described herein, pixel-space corresponds to a location on a display screen where an input event (e.g., an on-touch event) was detected, where the location is described in terms of the pixels of the display screen that were interacted with. For example, if the display screen is a N pixel by M pixel array, the coordinates of the input may include a first coordinate along the N pixel direction and a second coordinate along the M pixel direction. In some embodiments, a scaling factor may be applied to input location to obtain the coordinates. For example, if a particular location of a touch screen is determined to have detected the input, this may relate to another point in pixel space, and the mapping of from the two different coordinates may be scaled by the scaling factor.

In some embodiments, pressure may also be detected by a touch-sensitive display screen. As an example, pressure sensitive device or pressure may be configured to determine an amount of pressure applied to a surface. Based on an amount of pressure, a characteristic of the input may be determined. In some embodiments, an amount of force that an input has may indicate a depth of focus of the image. For example, a hard touch may indicate a larger area of interest, whereas a soft touch may indicate a smaller area of interest, or vice versa. The amount of force, and the corresponding area that the input was detected by, may indicate what a user sought to select within an image, the user's focus or interest within an image, and the like.

In some embodiments, eye gaze may also be used as an input channel for determining a location of an input to a display screen. In some embodiments, eye gaze may include tracking a position and movement of an individual's eyes to determine a location on a display screen (or other surface) that an individual's focus is directed towards. A front facing camera may be used to monitor and track an individual's pupils, and based on the individual's depth from the camera (e.g., a distance from the camera), and vectors from the camera to each pupil, a reconstruction of the individual's focus vector may be determined. The direction of the individual's gaze may be resolved to a location on a display screen, which may correspond to a particular location of the individual's focus at a given instant. In some embodiments, the eye tracking may also include capturing, continuously at a given sampling frequency (e.g., 240 Hz, 400 Hz, 600 Hz, etc.), the individual's gaze direction and therefore the location of focus of the individual. In some embodiments, the eye tracking may determine whether the individual's focus has dwelled on a particular location for more than a pre-defined threshold amount of time. If so, this may indicate, or be classified, as an input associated with a particular location in pixel-space of the dwell.

In some embodiments, input determination subsystem 120 may be configured to perform gesture recognition to determine an input to a computing device. The gestures, for example, may include touchless gestures (e.g., no keyboard, mouse, or screen is touched) or semi-touchless gestures (e.g., an auxiliary device is held by a user). In some embodiments, one or more cameras, which may be 2D or 3D cameras) may be used to detect a motion of an individual and, based on that motion, determine an action of the individual and a location that the action is directed towards. In some embodiments, a particular gesture may be classified as being an input (e.g., a point-like gesture), and using the directionality of the gesture and a reconstruction of where the gesture relates on a display screen, an input location in pixel-space may be determined.

In some embodiments, distance determination subsystem 122 may be configured to determine a distance between an input location of an input detected by a display screen and a location of an object depicted within an image displayed by the display screen. Additionally, distance determination subsystem 122 may be configured to determine a distance between feature vectors of an object depicted within an image and an object from a training data set or object ontology, which may indicate a similarity between the objects.

In some embodiments, the distance between an input location of an input and a location of an object may be computed by determining coordinates of the input location and coordinates of the object in pixel-space. For example, an image depicting an object may indicate that the object is located in pixel-space at coordinates (X1, Y1), while the coordinates in pixel-space of the input location may be (X2, Y2). In some embodiments, a distance between the object and the input may be determined by computing a difference between a vector directed to coordinates (X1, Y1) and a vector directed to coordinates (X2, Y2). In some embodiments, if an image depicts multiple objects, a determination may be made as to a focus of the input (e.g., which object an individual intended to select) based on a distance between the coordinates in pixel-space of the input location of the input and the coordinates in pixel space of each object. The coordinates in pixel space of the object may correspond to a centroid of the object, however alternatively a nearest edge, a farthest edge, or other anchor point of the object within the image may be used.

In some embodiments, the distance between two feature vectors (e.g., a feature vector describing an image depicting an object obtained by computer system 102 and a feature vector describing an image depicting an object from the training data set) may be compared to a threshold distance. If the distance is less than or equal to the threshold distance, then the two images may be classified as being similar, classified as depicting a same or similar object, or both. For example, if a cosine of an angle between the two vectors produces a value that is approximately equal to 1 (e.g., $Cos(\theta) \geq 0.75$, $Cos(\theta) \geq 0.8$, $Cos(\theta) \geq 0.85$, $Cos(\theta) \geq 0.9$, $Cos(\theta) \geq 0.95$, $Cos(\theta) \geq 0.99$, etc.), then the two feature vectors may describe similar visual features, and therefore the objects depicted within the images with which the features were extracted from may be classified as being similar. In some embodiments, the distance may refer to a distance in an n-dimensional feature space between the feature vector representing an obtained image and a feature vector of a corresponding image from the training data set. For example, the distance computed may include a cosine distance, a Minkowski distance, a Euclidean distance, or other metric by which similarity may be computed.

Figure 2:
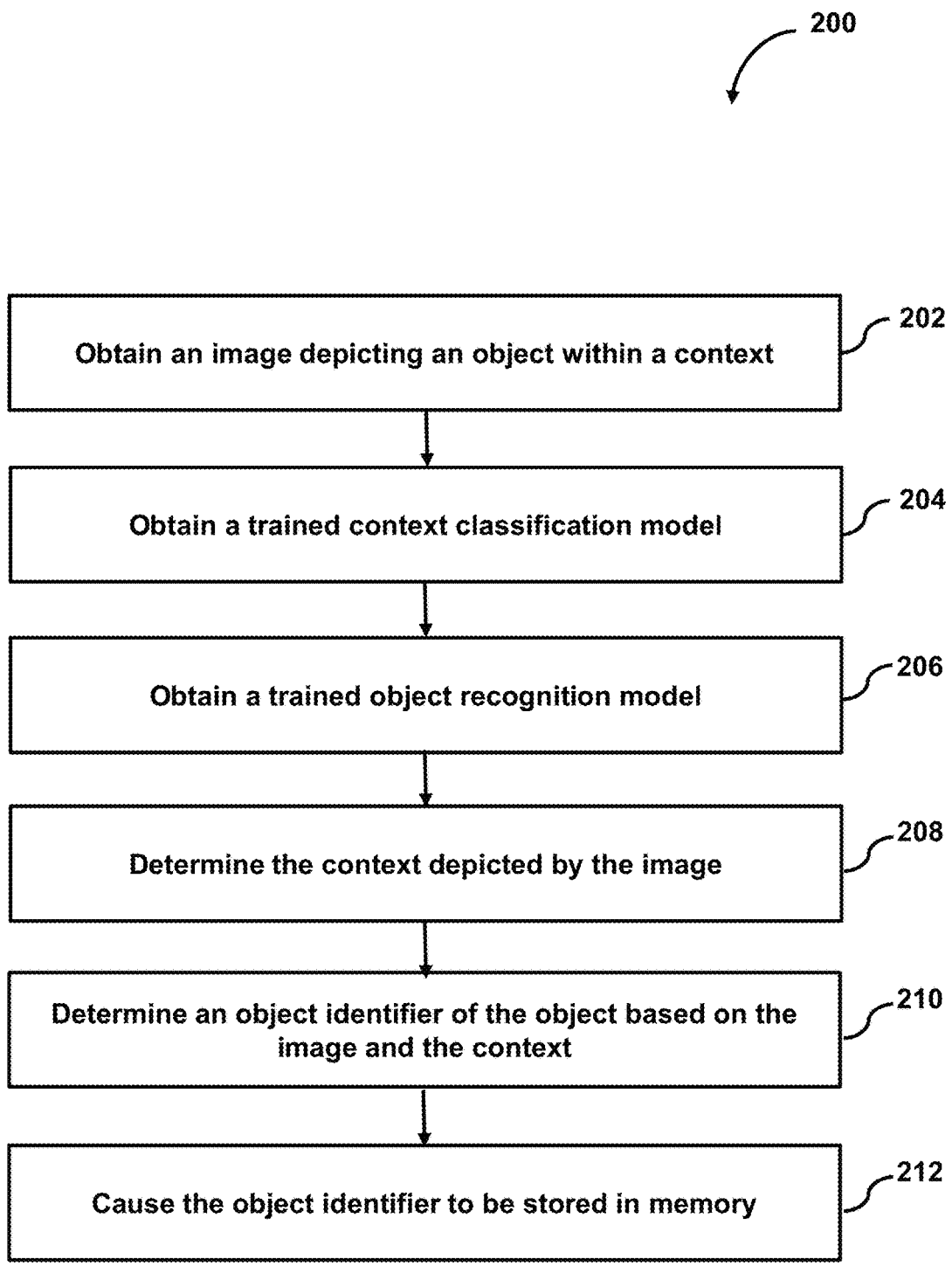
FIG. 2 illustrates an example process for recognizing an object depicted within an image based on a context of the image, in accordance with various embodiments.

FIG. 2 illustrates an example process for recognizing an object depicted within an image based on a context of the image, in accordance with various embodiments. In some embodiments, a process 200 may begin at step 202. At step 202, an image depicting an object within a context may be obtained. Some embodiments include obtaining the image from a camera of computer system 102, mobile computing device 104, kiosk device 106, or any other device. For example, an individual may capture an image using mobile computing device 104. In some embodiments, the image may depict one or more objects within a context, such as a scene. For example, the image may depict a hammer, nails, and saw within a garage. As another example, an image may depict a coat, skis, and a snowboard within an image of a snow-covered mountain. In some embodiments, the image may be provided to a visual search system for determining an identity of objects depicted within the image, as well as obtaining information regarding those objects (e.g., a name of the objects, where the objects may be purchased from, a material composition of the objects, etc.). In some embodiments, step 202 may be performed by a subsystem that is the same or similar to context classification subsystem 112, object recognition subsystem 114, or a combination thereof.

At step 204, a trained context classification model may be obtained. Various context classification models may be stored in model database 138. Each context classification model may be trained for a particular context. For example, one context classification model corresponds to a scene classification model. Context database 132 may store contexts from a context ontology including a plurality of contexts. In some embodiments, the context ontology may be organized into different types of contexts. For example, one type of context may be a scene, and a portion of the context ontology may be a scene ontology including a plurality of scenes. In some embodiments, the context classification model may be trained using a training data set including a set of images including different contexts, where each image is labeled with a context identifier of the context described by that image. For example, if the contexts are scenes, and the context classification model is scene classification model, the training data set may include a plurality of images of different scenes, where each scene is labeled with a scene identifier indicating a scene depicted within the corresponding image (e.g., a beach, a field, a garage, etc.). In some embodiments, the context identifiers may include a context classification vector in a continuous vector space, where the vector includes null values for all elements except for the element corresponding to the context (or contexts) depicted by a given image. For example, if the image is of a beach, a scene vector, $V=\{v1=0, v2=0, \ldots, v50=1, \ldots, vn\}$, associated with the image may be stored in training data database 136, where element v50 corresponds to the category "beach." In some embodiments, step 204 may be performed by a subsystem that is the same or similar to context classification subsystem 112, model subsystem 116, or a combination thereof.

At step 206, a trained object recognition model may be obtained. Various object recognition models may be stored in model database 138. Each object recognition model may be trained for a particular object (e.g., a specific object recognition model, such as an object recognition model configured to recognize dogs, logos, hardware, etc., within an image) or trained for general object recognition (e.g., capable of recognizing various different objects). Object database 134 may store objects from an object ontology including a plurality of objects. In some embodiments, the object ontology may be organized into different types of objects. For example, one type of object may be cats, while another type of object may be drills, and while yet another type of object may be human faces. In some embodiments, the object recognition model may be trained using a training data set including a set of images depicting different objects, either of a same type (e.g., all depicting dogs) or of different types (e.g., some depicting dogs, some depicting cats, some depicting houses, etc.). Each image may be labeled with an object identifier of the object depicted by that image. In some embodiments, the object identifiers may be associated with a feature vector in a continuous vector space, where the feature vector of an image describes visual features extracted from the image depicting an object labeled with the object identifier. The image, the object identifier, the feature vector, or a combination thereof, may be stored in training data database 136. The object recognition model may be trained using the training data set such that the object recognition model is capable of recognizing instances of the objects included within the images of the training data set if included within an input image (e.g., an image captured by computer system 102, mobile computing device 104, or kiosk device 106). In some embodiments, step 206 may be performed by a subsystem that is the same or similar to object recognition subsystem 114, model subsystem 116, or a combination thereof.

At step 208, the context depicted by the image may be determined. In some embodiments, the image may be provided as an input to the trained context classification model, and a context classification vector indicating an identified context of the image may be output. For example, if the trained context classification model is a trained scene classification model, a scene classification vector indicating a scene depicted within the image may be output from the trained scene classification model. In some embodiments, step 208 may be performed by a subsystem that is the same or similar to context classification subsystem 112.

At step 210, an object identifier of the object depicted within the image may be determined based on the image and the context. In some embodiments, the image and the context identified by the context classification model (e.g., a context classification vector) may be provided as an input to the trained object recognition model. The trained object recognition model may output an object classification vector, object distribution, or probability function, that indicates an object (or objects) depicted within the image. In some embodiments, the object identifier of the object may be assigned or associated with the image based on the object recognition model's determination. In some embodiments, the object identifier or feature vector associated with the identified object, the initially identified context, and the image, may be provided back to the context classification model, the object recognition model, or both, to determine (i) if the initially identified context is accurate based on the object(s) depicted within the image, as well as, or alternatively (ii) whether any other objects are determined to be present within the image based on the detected object. In some embodiments, step 210 may be performed by a subsystem that is the same or similar to object recognition subsystem 114.

At step 212, the object identifier may be caused to be stored in memory. For example, the object identifier for the identified object may be stored in training data database 136 as being associated with the analyzed image, a feature vector describing the image, context classification vector describing the context of the image, or a combination thereof. In some embodiments, step 212 may be performed by a subsystem that is the same or similar to context classification subsystem 112, object recognition subsystem 114, or a combination thereof.

Figure 3:
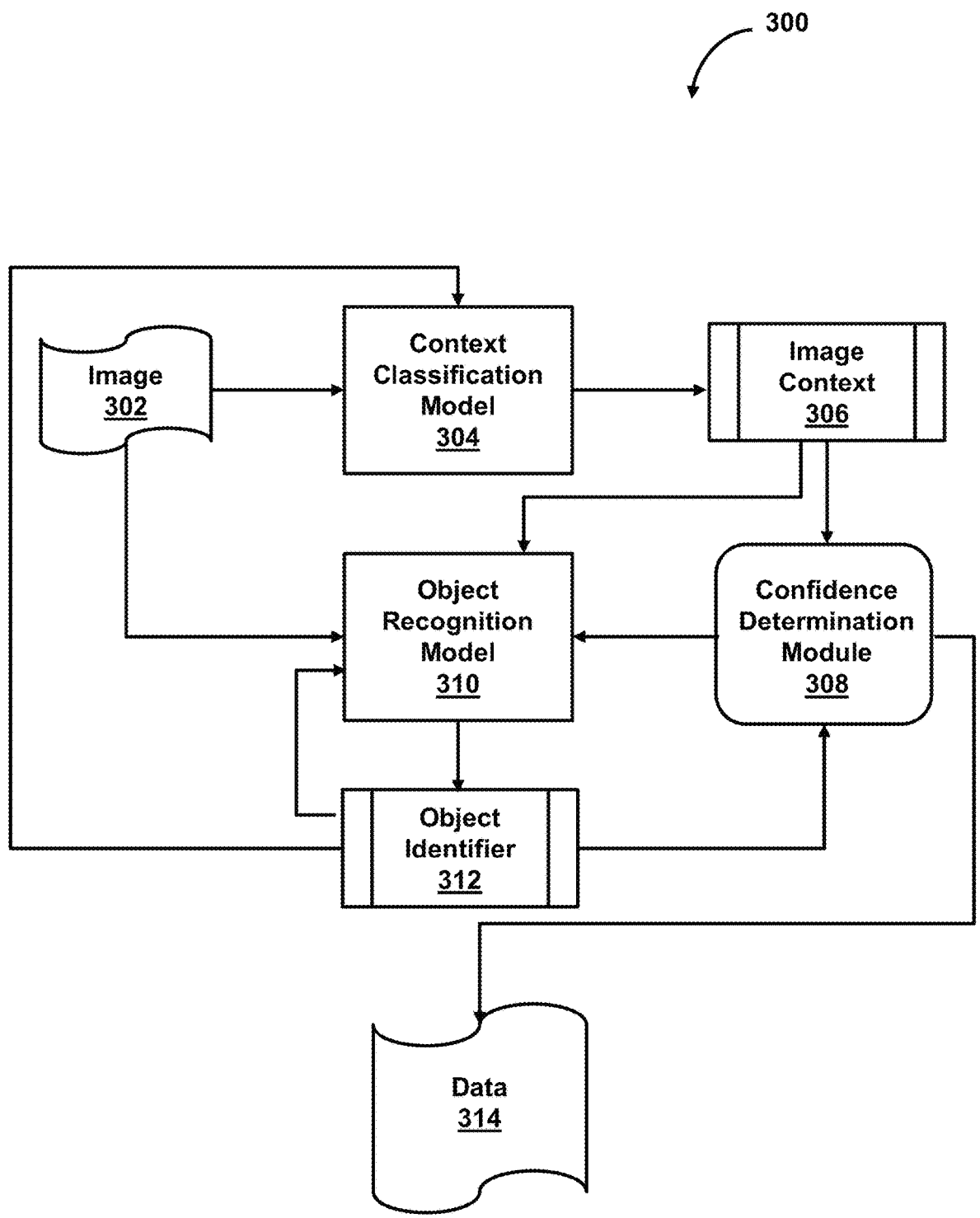
FIG. 3 illustrates an example data pipeline for determining an object depicted within a context of an image, in accordance with various embodiments.

FIG. 3 illustrates an example data pipeline for determining an object depicted within a context of an image, in accordance with various embodiments. Pipeline 300 may include two central components: (i) a context classification model 304 and (ii) an object recognition model 310. As previously mentioned, context classification model 304 may be a trained context classification model and object recognition model 310 may be a trained object recognition model. In some embodiments, context classification model 304 may be a scene classification model. Context classification model 304 and object recognition model 310 may both include, or be formed by, a convolutional neural network (CNN), a discriminative neural network, a region-based CNN (R-CNN), a Fast R-CNN, a Masked R-CNN, Single Shot Multibox (SSD), and a You-Only-Look-Once (YOLO) model, or any other type of machine learning model, or any combination thereof. Furthermore, context classification model 304, object recognition model 310, or both, may be implemented using server-side programming architecture, such as Python, Keras, and the like, or they may be implanted using client-side programming architecture, such as TensorFlow Lite or TensorRT.

In some embodiments, image 302 may be provided as an input to context classification model 304. Context classification model 304 may be configured to determine a context of the image, and may output image context 306. Some embodiments include multiple image contexts being output by context classification model 304. For instance, a scene classification of a scene depicted within image 302 may be output, as well as a geographical classification indicating a geographical location where image 302 was captured. The geographical location may include GPS coordinates of computer system 102, mobile computing device 104, or kiosk device 106. For example, the geographical location may indicate where a user is based on the GPS location (e.g., a country where the user is when capturing an image, a city where the user's computing device is, an address proximate the GPS coordinates of the mobile computing device, etc.). In some embodiments, the geographical location may also indicate a location of a mobile computing device, and by relation a user, within a given area. For example, the geographical location of an image may be used to determine an approximate location of the user within a retail store (e.g., the image was determined to be taken in a Sporting Goods section of a store). In some embodiments, image context 306 (e.g., a scene classification) may be provided as an input to object recognition model 310. Object recognition model 310 may be configured to determine an object identifier of an object depicted within image 302 based, at least in part, on image context(s) 306 and image 302. Some embodiments may include multiple object identifiers being output by object recognition model 310.

In some embodiments, object identifier 312 may be provided to context classification model 304 for determining whether image context 306 is to be updated based on object identifier 312. For example, context classification model 304 may have initially classified a context of image 302, such as a scene of image 302, as being an outdoor scene. However, object recognition model 310 may have determined that an object depicted within image 302 is a hammer. Therefore, using object identifier 312 (e.g., an identifier for a hammer), context classification model 304 may determine that a scene of image 302 is not an outdoor scene, but instead is a garage scene. Therefore, image context 306 may be updated to now include a scene classification of a garage. Furthermore, the updated image context, which may still be labeled as image context 306, may be provided back to object recognition model 310 for determining whether any additional objects are now determined as being present within image 302 based on the updated image context 306, as well as based on object identifier 312. For example, now that the scene classification indicates that the scene is a garage, other objects typically found in a garage may be upweighted by object recognition model 310 (e.g., automobiles, bikes, etc.) and a likelihood of those object's presence within image 302 may be determined. In some embodiments, multiple regions of interest (ROIs) may be detected within an image, and for each ROI, a determination may be made as to whether an object is detected, and a confidence level associated with that determination may be computed. If the confidence level exceeds a threshold confidence level, then the identified object may be classified as being detected within that ROI. However, if the confidence level does not exceed the threshold confidence level, then the image may not be classified as including the object. In some embodiments, after providing the updated image context 306, as well as object identifier 312, to object recognition model 310, the confidence level for those objects previously detected (e.g., that had a confidence level not exceeding the threshold confidence level), may be recomputed. If the confidence level is determined to exceed the threshold confidence level, then the object identifier associated with those objects may be attributed to image 302 and stored in memory (e.g., within training data database 136). However, if not, then the previously determined object identifier 312 may be stored in memory in association with image 302.

In some embodiments, the object recognition model and context classification model may form a loop for dynamically analyzing captured video or images in real-time, and making adjustments based on the continuously evolving analysis. For example, a mobile robot, autonomous vehicle, drone, mobile manipulator, assistive robots, and the like, may ingest video or images in real-time, determine a context of the image (e.g., a scene), determine objects within the image based on the determined context and the image, and then return the determined object and initially determined context to update, if necessary, the context. Furthermore, the continuous real-time analysis of the object(s) within the image and the context(s) of the image may further refine the sub-class of object and sub-class of context of the image.

In some embodiments, a confidence determination module 308 may be included within pipeline 300. Confidence determination module 308 may be configured to determine whether a confidence level of an image context output by context classification model 304 (e.g., image context 306) exceeds a threshold confidence level. If so, then the input image (e.g., image 302) may be classified as depicting that context. The image context (e.g., image context 306) may then be provided to object recognition model 310 (along with image 302) for performing object recognition on image 302. Furthermore, confidence determination module 308 may also be configured to determine a confidence level of an object identifier of an object or objects determined to be present within image 302 based on image context 306 and image 302. As mentioned above, if the confidence level of the objects determined to be depicted within image 302 exceeds the threshold confidence level, then data 314 including object identifier 312, image 302, image context 306, a feature vector describing image 302, or visual features extracted from image 302, may be output to be stored in memory. For example, object identifier 312 may be assigned to image 302, image context 306, a feature vector or features describing image 302, or a combination thereof. However, if the confidence level does not exceed the threshold confidence level, then those objects may not be stored in association with image 302, image context 306, or a feature vector or features describing image 302.

In some embodiments, object recognition model 310 may proceed context classification model 304. For example upon receiving image 302, object recognition model 310 may determine object identifier 312 of an object determined to be presented within image 302 (e.g., having a confidence level exceeding a threshold confidence level). Object identifier 312 may then be provided to context classification model 304 with image 302 for determining image context 306 of image 302. In some embodiments, object identifier 312 may also be provided back to object recognition model 310 for determining whether any other objects are present within image 302. For example, because the identifier object is known to be related to one or more other objects (e.g., skis are determined to be related to winter coats), those related objects (e.g., nodes connected by edges in a knowledge graph to the identified object) may be upweighted during analysis by object recognition model 310.

Figure 4:
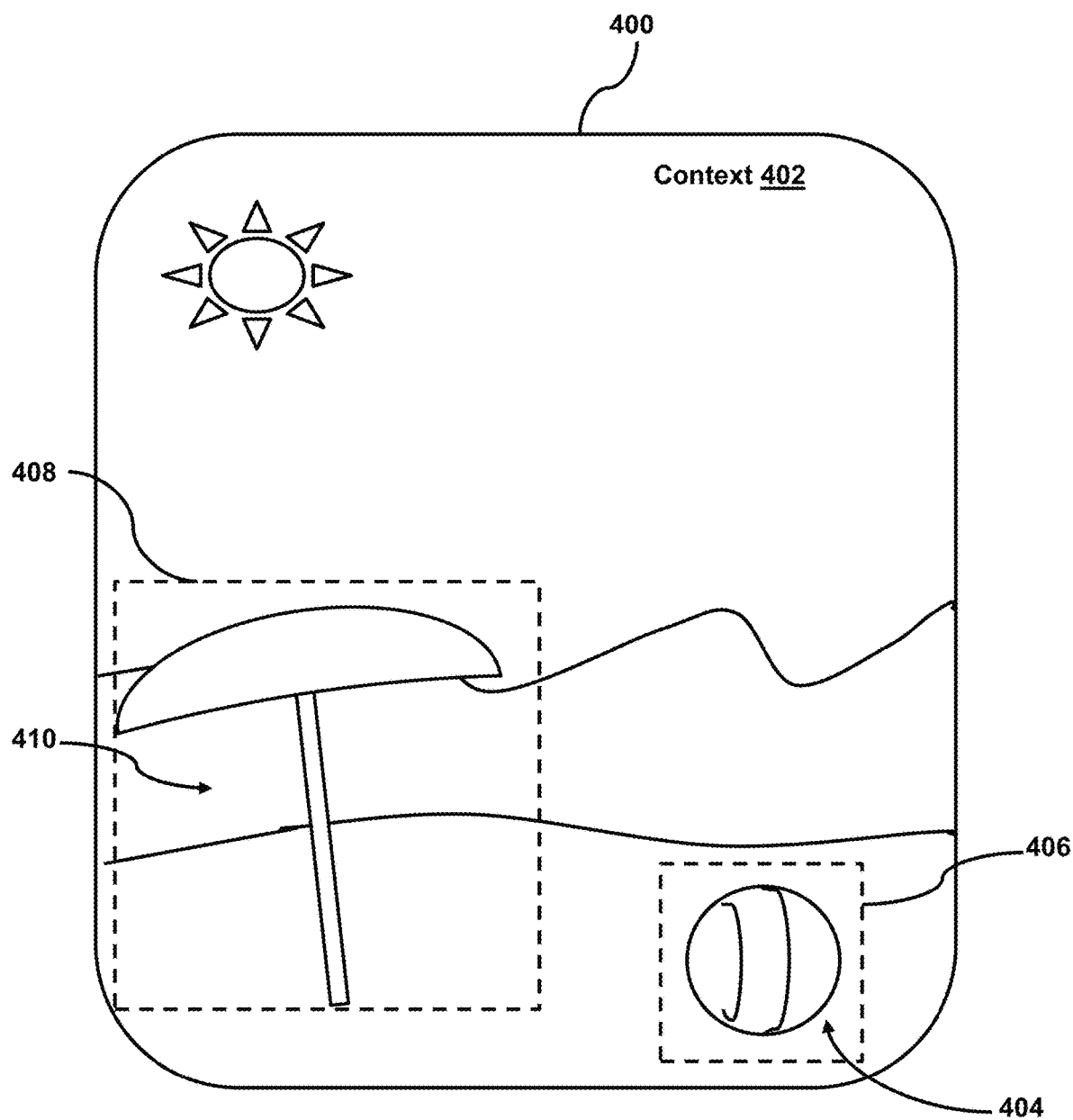
FIG. 4 illustrates an example of an image depicting a first object and a second object within a context, in accordance with various embodiments.

FIG. 4 illustrates an example of an image depicting a first object and a second object within a context, in accordance with various embodiments. In some embodiments, image 400 may include a context 402, a first object 404, and a second object 410. For example, context 402 may refer to a scene of image 400, such as a beach scene; first object 404 may correspond to a ball; and second object 410 may correspond to a beach umbrella. In some embodiments, image 400 may be provided to a context classification model, such as a scene classification model, to determine a context of image 400. For example, context 402 of image 400 may be a beach scene. The identified context (e.g., Scene=Beach) may be provided with image 400 to an object recognition model for determining whether any objects are present within image 400.

The identified context may function to (1) restrict a search to be narrowed to objects only related to the identified context, or (2) apply a weight to the search to weigh object related to the identified context greater than objects not related to the identified context. For example, the object recognition model may restrict the search for potential objects within image 400 to objects associated with a beach scene (e.g., beach balls, umbrellas, kites, sunscreen, coolers, towels, surfboards, etc.). This technique may be advantages in some cases as the object recognition model may be able to quickly identify objects within the image that fall within the restricted subset of objects, however it is possible for objects to be present in the image that are not normally located within this restricted subset of objects. Therefore, this technique may quickly and accurately identify objects within a given context. As another example, the object recognition model may weight objects related to the beach scene greater than objects not related to the beach scene. In this example, objects related to a beach scene (e.g., beach balls, umbrellas, kites, sunscreen, coolers, towels, surfboards, etc.) may have their weights increased in the object recognition model, whereas objects unrelated to a beach scene (e.g., winter coats, snowboards, etc.) may not have their weights increased, or even may have their weights decreased. This technique may be advantages in some cases as the object recognition model may be able to more readily identify objects present in the image even if those images are not associated with the identified context, however because more potential objects are available as being classified within the image, more computing resources and time may be needed. Therefore, this technique may be able to identify a broad range of objects regardless of whether they are part of the classified context of the image.

In some embodiments, while image 400 may depict both first object 404 and second object 410, the object recognition model may initially be only available to classify image 400 as including one object. For example, the object recognition model may initially only recognize first object 404 within first bounding box 406, where first object 404 may be identified based, at least in part, on context 402. In some cases, the object recognition model may have determined that image 400 includes two regions of interest, each of which includes a candidate object, and placed a bounding box around those candidate objects. For example, first bounding box 404 may be placed around first object 404 and a second bounding box 408 may be placed around second object 410. A confidence level may be computed that the object detected in each of bounding boxes 406 and 408 is a particular object from an object ontology, based at least in part on context 402 of image 400. In some embodiments, the confidence level for first object 404 may exceed a threshold confidence level, while the confidence level for second object 410 may not exceed the threshold confidence level. Therefore, while two candidate objects were detected, the object recognition model may only be able to output an object identifier for first object 404. In some embodiments, upon recognizing first object 404, the object recognition model may be provided with an object identifier associated with first object 404 and context 402 as feedback, and another iteration of searching for objects within image 400 may be performed. In this iteration, the confidence level for second object 410 may increase based on a known relationship with first object 404, for example based on information included within a knowledge graph. Therefore, the object recognition model may be configured to output object identifiers for both first object 404 and second object 410, and may further store the object identifiers in memory in association with image 400.

Figure 5:
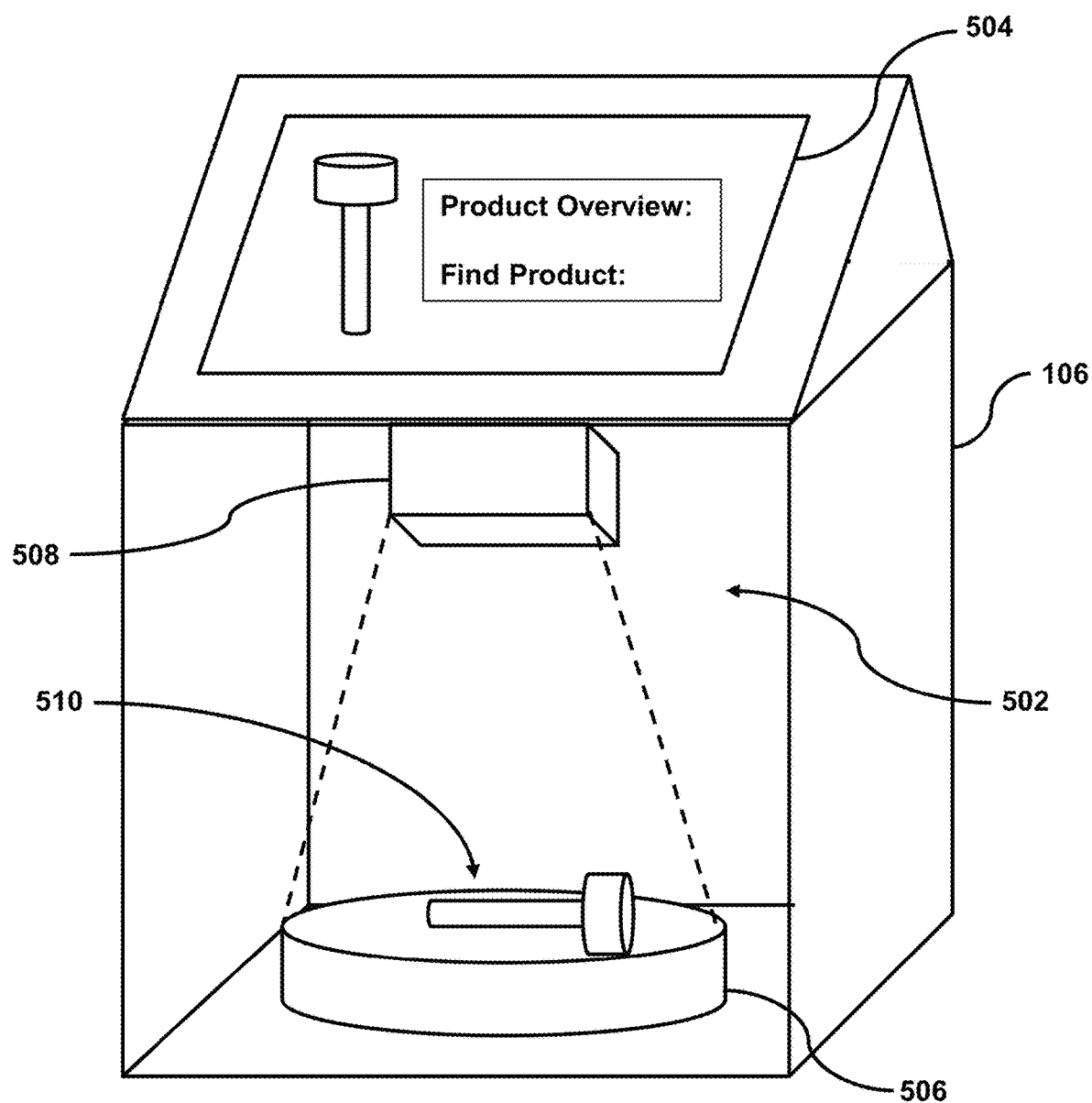
FIG. 5 illustrates an example of a kiosk device for capturing an image of an object and facilitating a performance of a visual search based on the image, in accordance with various embodiments.

FIG. 5 illustrates an example kiosk device for capturing images of objects and performing visual searches for those objects, in accordance with various embodiments. In some embodiments, kiosk device 500 may be a device configured to receive an object, capture an image of the object, facilitate performance of a visual search using the image of the object as an input query image, and provide information regarding one or more results of the visual search. Kiosk device 500 of FIG. 5 may be substantially similar to kiosk 106 of FIG. 1, and the previous descriptions may apply equally.

Kiosk device 500 may include an open cavity 502 where objects may be placed. For example, cavity 502 may be surrounded on five sides by walls or other physical structures, which may be impermissible to light, semi-transparent, or fully transparent, while one side may be open such that individuals may place objects within cavity 502. In some embodiments, individuals may place objects within cavity 502 to obtain information about the object. For example, if an individual needs to identify a type of nail, the individual may bring the nail to a facility where kiosk device 500 is located, place the nail within cavity 502, and obtain information regarding the type of nail, sub-type of nail, color, shape, size, weight, material composition, location of that nail within the facility, a cost for purchasing the nail, or any other information related to the nail, or any combination thereof. In some embodiments, kiosk device 500 may include one or more sensors capable of determining information about the object placed within cavity 502. For example, kiosk device 500 may include a weight sensor 506, which may be configured to determine a weight of an object 510 placed within cavity 502. As another example, kiosk device 500 may include sensors capable of determining a density of object 510, length, width, depth, height, etc., of object 510, density of object 510, a material composition of object 510, or any other feature or characteristic of object 510, or any combination thereof. In some embodiments, sensors 506 may be located on an inner surface of cavity 502 of kiosk device 500. In some embodiments, one or more of sensors 506 may be integrated within a lower wall of cavity 502 (e.g., a bottom wall), any of the side walls, the upper wall, or a combination thereof. In some embodiments, kiosk device 500 may include one or more processors and memory storing computer program instructions that, when executed by the processors, cause sensors 506 to record data representative of a measurement captured by sensors 506. For example, sensors 506 may continually, periodically, or upon request (e.g., in response to a user pressing a button or determining that an object has entered into the space of cavity 502) capture a weight detected by sensors 506. In some embodiments, the data (e.g., weight data) may be stored in memory of kiosk device 500 and used as an input channel for a visual search.

In some embodiments, kiosk device 500 may include one or more image capture components 508 configured to capture an image of an object (e.g., object 510) placed within cavity 502. For example, image capture components 508 may include one or more cameras configured to capture two-dimensional images, three-dimensional images, high definition images, videos, time series images, image bursts, and the like. In some embodiments, image capture components 508 may have a field of view (FOV) capable of capturing an image or video of some or all of a surface of sensors 506. In some embodiments, image capture components 508 may include one or more infrared scanning devices capable of scanning cavity 502 to determine a shape of object 510, textures, patterns, or other properties of object 510, or additional features of object 510. In some embodiments, image capture components 508 may generate, store, and output data representative of the image, video, scan, etc., captured thereby, which may be stored in memory of kiosk device 500.

Kiosk device 500 may also include a display screen 504 located on an upper surface of kiosk device 500. Alternatively, display screen 504 may be a separate entity coupled to kiosk device 500 (e.g., a separate display screen). In some embodiments, display screen 504 may display an interface viewable by an individual, such as the individual that placed object 510 within cavity 502. Display screen 504 may provide a real-time view of object 510 from various perspectives, such as a perspective of image capture components 508. In some embodiments, display screen 504 may display a captured image or video of object 510 after being captured by image capture components 508. For instance, after capturing an image of object 510, an image of object 510 may be displayed to an individual via display screen.

Some embodiments may include providing the image of the object (e.g., object 510), as well as any additional information about the object determined by sensors 506, image capture components 508, or both, to a computer system capable of performing a visual search. For instance, the image and any other data regarding object 510 determined by kiosk device 500 may be provided to a computer system, such as computer system 102 of FIG. 1, to perform a visual search. In some embodiments, a computer system including visual search functionality may be located at a same facility as kiosk device 500. In some embodiments, kiosk device 500 may include the visual search functionality, and may therefore perform the visual search itself. Upon providing the image depicting object 510, and any other information (e.g., weight of object 510), to the visual search system, search results indicating objects determined as being similar to object 510 may be displayed via display screen 504. For example, the image depicting object 510, as well as the additional information, if available, may be provided to computer system 102. Computer system 102 may extract visual features describing object 510 using a trained computer-recognition object recognition model, and may generate a feature vector describing at least a subset of the extracted visual features. The feature vector may be mapped to an n-dimensional feature space, and distances between the feature vector and other feature vectors (each corresponding to a set of visual features extracted from an image previously analyzed by the computer-vision object recognition model) may be computed. If the distance between the feature vector describing the visual features extracted from the image depicting object 510 and a feature vector describing visual features extracted from an image depicting an object is determined to be less than a threshold distance value, then the image depicting object 510 and the image depicting the object may be classified as being similar to one another. Therefore, an object identifier used to label the object depicted by the previously analyzed image may be assigned to the image depicting object 510. In some embodiments, the object identifier, the image depicting object 510, and the feature vector describing the image depicting object 510 may be stored in memory (e.g., image database 132) together. Furthermore, information previously obtained describing the other image may be presented to an individual (e.g., the individual that placed object 510 within cavity 502) via display screen 504. For example, if object 510 is a particular nail that an individual seeks to purchase additional instances of, the results of the search performed using the image of the nail may indicate the name of the nail, a brand of the nail, a type of the nail, a cost of the nail, a material composition of the nail, and a location of where the nail is located within a facility so that the individual may obtain additional instances of the nail. In some embodiments, an individual may be capable of purchasing instances of the identified object via kiosk device 500, such as by inputting payment information and delivery information such that the additional instances of the identified object may be shipped directly to the individual's home. In some embodiments, kiosk device 500 may be in communication with a three-dimensional printing device, and in response to identifying the object, kiosk device 500 may facilitate the three-dimensional printing device to print a replica of the identified object.

Figure 6:
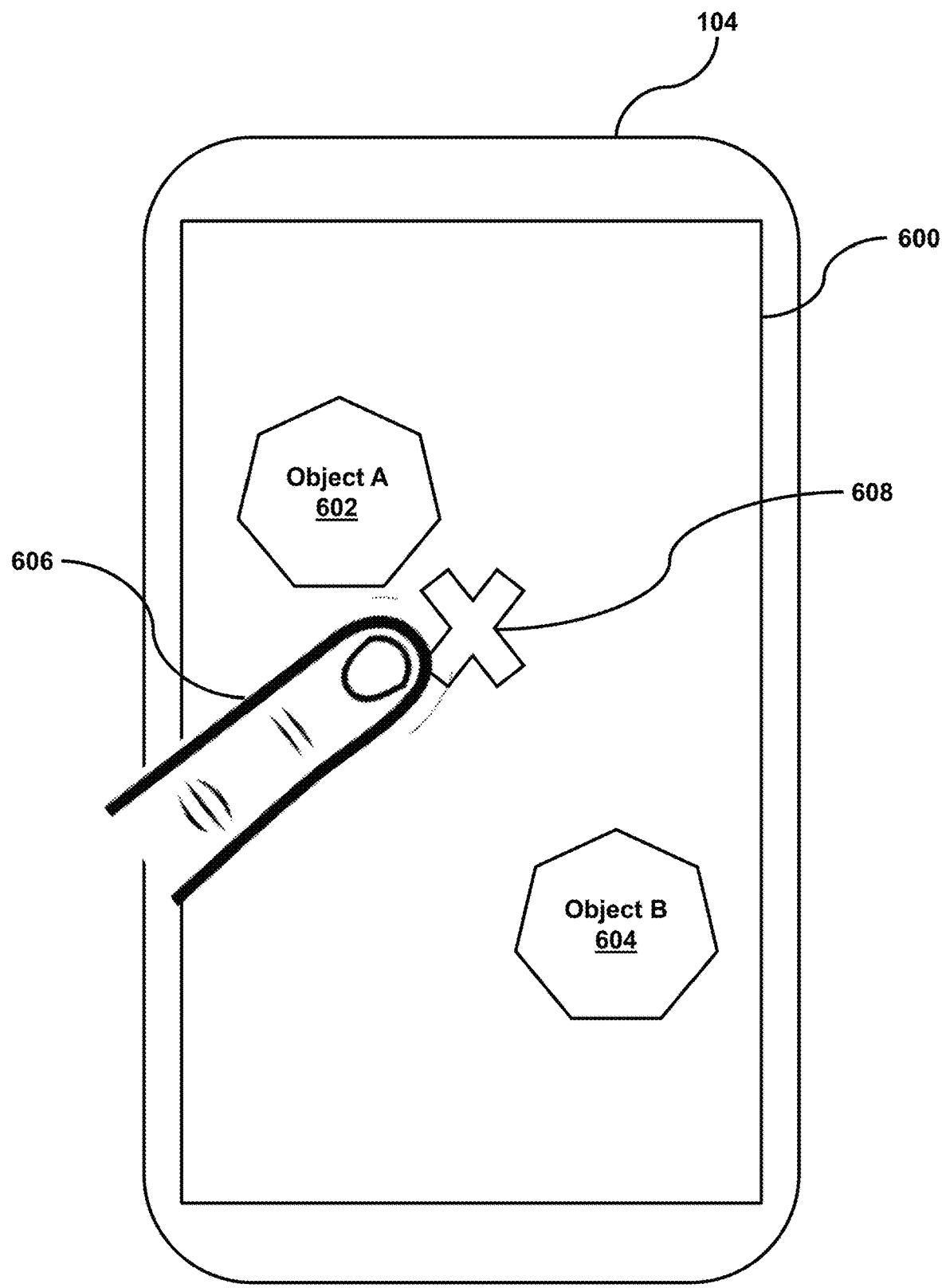
FIG. 6 illustrates an example of an image depicting objects being captured responsive to an input detected by a mobile computing device, in accordance with various embodiments.

FIG. 6 illustrates an example of an image depicting objects being captured responsive to an input detected by a mobile computing device, in accordance with various embodiments. In some embodiments, mobile computing device 104 may include a display screen 700. For instance, display screen 700 may a touch-sensitive display screen capable of detecting touch inputs. For example, display screen 700 may be a touch screen including capacitive sensing panels capable of recognizing touch inputs thereon. For instance, a touch screen may correspond to a projected capacitive touch ("PCT"), screen include one or more row traces and/or driving line traces, as well as one or more column traces and/or sensing lines. In some embodiments, display screen 700 may include a touch-sensing display interface that includes a multi-touch panel coupled to one or more processors to receive and detect gestures. Multi-touch panels, for example, may include capacitive sensing mediums having a one or more of row traces and/or driving line traces, and one or more column traces and/or sensing lines. In some embodiments, mobile computing device 104 may include one or more image capturing components, such as a front-facing camera, a rear facing camera, multiple instances of either, or both.

In some embodiments, a user interface (UI) of a native application may be displayed by display screen 700. The native application may access a camera functionality of mobile computing device 104, such as a front-facing or rear-facing camera, and may display within the UI a visual depiction of an environment captured by a field of view of the camera currently in use. To capture an image or video, a user operating mobile computing device 104 may perform an action to signify to the native application that a capture image or capture video event has been invoked. Typically, such an input may be detected by an actuation of a button, which may be a physical button (e.g., a button that can be compressed to close a circuit to cause the image to be captured) or a virtual button (e.g., a button depicted on a portion of the UI such that when display screen 700 detects a touch event at an input location of where the button is displayed, the image is captured).

In some embodiments, the native application rendered by the UI displayed on display screen 700 may not include a physical or virtual button. Instead, the native application may facilitate capture of an image or video in response to detecting a particular input event. Some examples of such input events may include, but are not limited to, an on-touch event whereby a capacitive object (e.g., a finger, a stylus, etc.) physical contacts a surface of display screen 700 (e.g., a touch-sensitive display screen), a multi-touch event whereby multiple objects physical contact the surface of display screen 700, a touch gesture whereby a capacitive object physical contacts multiple points on the surface of display screen 700 in a defined manner, a hover gesture whereby direct physical contact between the surface of display screen 700 is not detected but a determination is made that a capacitance change as a result of a capacitive object being in close enough proximity (e.g., 1-2 mm away) to display screen 700 to augment a local electric field about a portion of the capacitive elements of display screen 700, an eye gaze event whereby a user's eyes are tracked and determined to dwell on a location of display screen 700 for a predefined amount of time (e.g., 1-3 seconds), or a physical gesture such as a hand wave, air-drawn circle, and the like detected by a gesture tracking system, or any other input type, or any combination thereof. In response to detecting such an input event, the native application may cause the camera component of mobile computing device 104, or a camera component coupled to mobile computing device 104, to capture an image or begin (or end) capture of a video or other series of images.

In some embodiments, the image captured in response to the input may include one or more objects. For example, display screen 700 may display an image depicting a first object 702 ("Object A") and a second object 704 ("Object B"). Both objects may be displayed within the image at different locations, may encompass a different amount of area of display screen 700 (e.g., have different pixel areas), and may represent different objects (e.g., different objects of an object ontology including a plurality of objects).

In some embodiments, an individual may select an object displayed on display screen 700, or otherwise provide an inference of an intended target of the input provided by the individual, based on which object is proximate to the input. For example, an individual providing a touch input via their finger 706, where the touch input is proximate one of the objects displayed by display screen 700. Depending on which object the touch input is closest to in pixel-space, that object may be inferred as the intended target intent or interest of the user, and that object may be provided to a visual search system for obtaining additional information about the object. As an example, a touch input by finger 706 may contact display screen 700 at an input location 708. Input location 708 may be closer to a location of first object 702 on display screen 700 as compared to second object 704. In other words, a distance in pixel-space of the image displayed by display screen 700 between coordinates of input location 708 and coordinates of first object 702 may be less than a distance in pixel-space between coordinates of input location 708 and coordinates of second object 704. Therefore, the visual search may focus its search on first object 702.

In some embodiments, the native application may crop a portion of the image including first object 702 and input location 708, and the cropped portion of the image may be input to the visual search system. In some embodiments, the native application may apply a bounding box to first object 702 and may enhance a portion of the image within the bounding box, where the enhanced portion may be input to the visual search system alone, with the rest of the image, or with the rest of the image and a weight applied to the portion to indicate prominence of the portion. In some embodiments, the remaining portions of the image not including first object 702 may be down-scaled in resolution or otherwise compressed to reduce a file size of the image for the visual search. For example, if the visual search functionality resides, at least in part, on a remote server system, the reduced file size image may be transmitted faster to the remote server system and may also facilitate a faster search.

Figure 7:
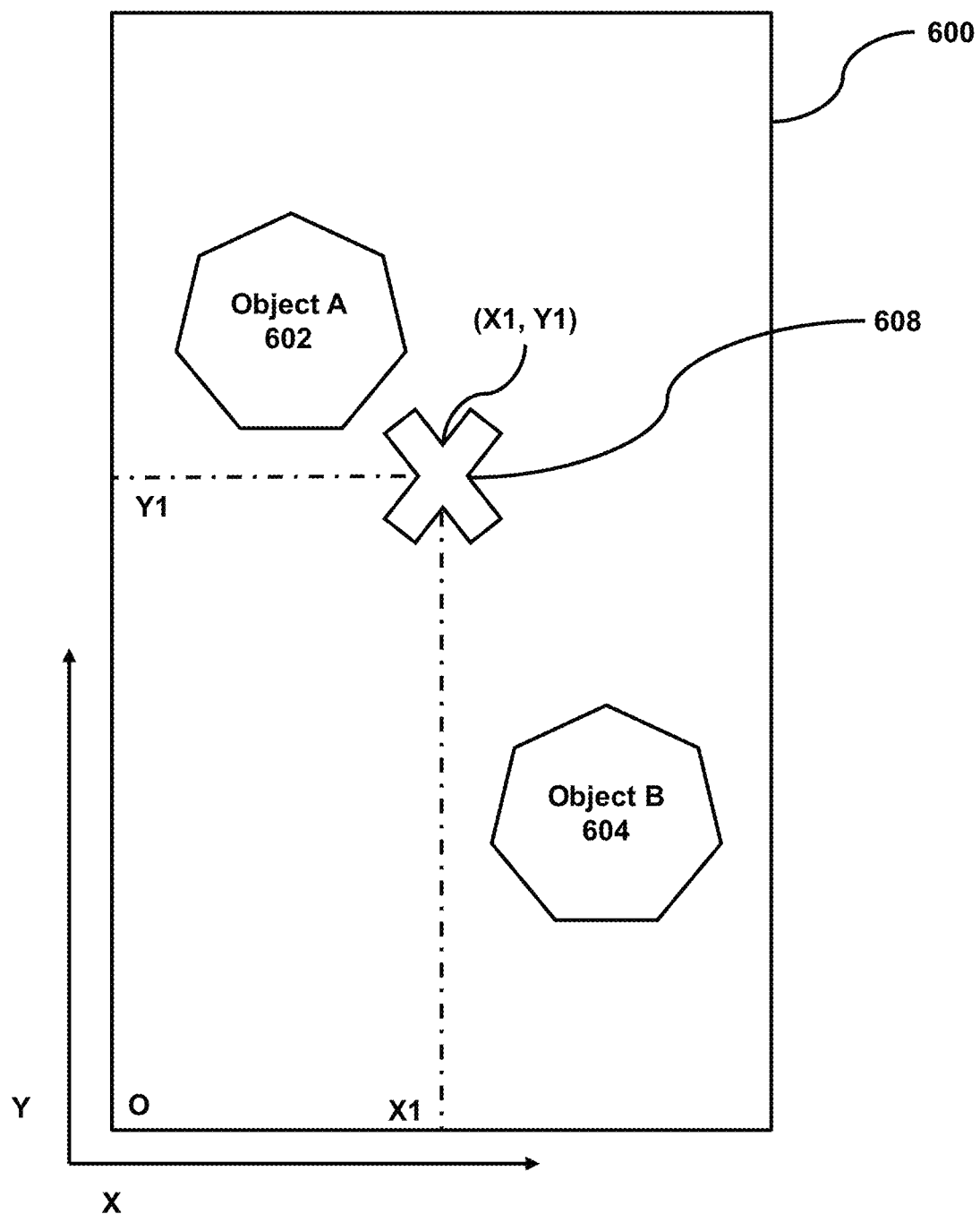
FIG. 7 illustrates an example of determining coordinates of an input location of an input detected by a display screen of a mobile computing device, in accordance with various embodiments.

FIG. 7 illustrates an example of determining coordinates of an input location of an input detected by a display screen of a mobile computing device, in accordance with various embodiments. In some embodiments, coordinates (X1, Y1) in pixel-space of input location 708 may be resolved by mobile computing device 104 including display screen 700 (or computer system 102 if computer system 102 includes an instance of display screen 700). Coordinates (X1, Y1) may be determined based on a position of input location 708 along a first and second axes of display screen 700, such as an X axis and a Y axis. Upon detecting the input at input location 708, the coordinates along each dimension (e.g., the X-dimension and the Y-dimension) may be extrapolated, thereby obtaining the coordinate X1 along the X-axis and coordinate Y1 along the Y-axis for input location 708.

Figure 8:
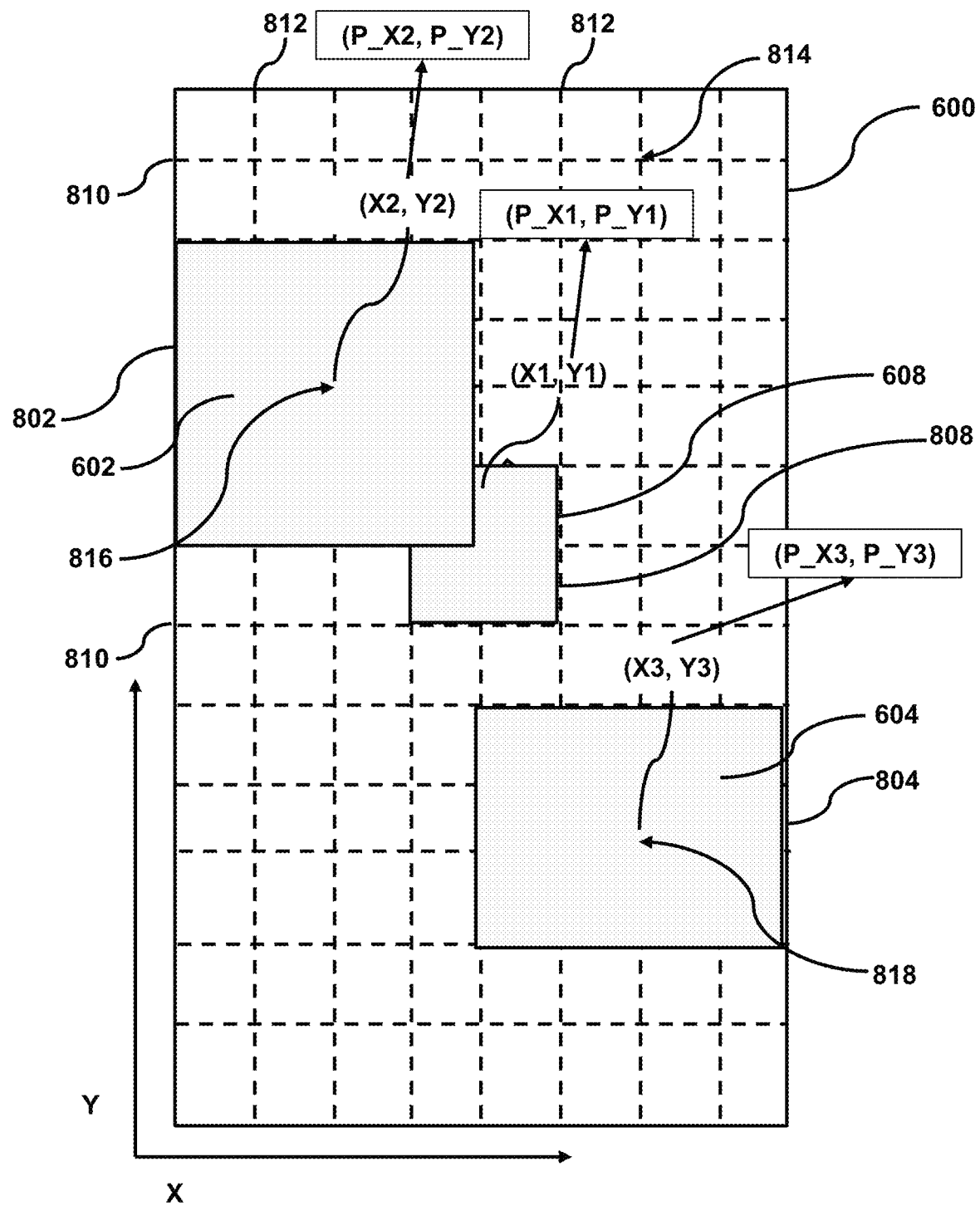
FIG. 8 illustrates an example of a display screen for a mobile computing device segmented into blocks for determining regions of interest and coordinates of an input location of an input detected by the display screen, as well as objects depicted within an image displayed by the display screen, in accordance with various embodiments.

FIG. 8 illustrates an example of a display screen for a mobile computing device segmented into blocks for determining regions of interest and coordinates of an input location of an input detected by the display screen, as well as objects depicted within an image displayed by the display screen, in accordance with various embodiments. In some embodiments, display screen 700 may be segmented into blocks, and coordinates (X1, Y1) of input location 708 may be determined based on which blocks are encompassed by input location 708. Similarly, coordinates (X2, Y2) and (X3, Y3) of first object 702 and second object 704, respectively, may also be determined based on the blocks encompassed by those objects as displayed within the UI of display screen 700.

In some embodiments, each block may represent a portion of display screen 700 obtained by segmenting display screen 700 based on driving lines 812 and sensing lines 810. Intersections 814 between driving lines 812 and sensing lines 810 may correspond to coordinates in pixel-space of an image displayed on display screen 700. For example, input location 708 may intersect with a driving line 812 and a sensing line 810 at coordinates (X1, Y1), which may be mapped to coordinates in pixel-space based on a density of driving lines 812 and sensing lines 810. In some embodiments, the mapping from physical coordinates of driving lines 812 and sensing lines 810 may be 1:1 (e.g., each coordinate along each axes relates to a corresponding pixel along that axes), or a scaling factor may be applied. In the latter example, a number of intersections 814 may be less than (or greater than) a resolution of the image displayed by display screen 700, and therefore each intersection 814 may relate to a subset of pixels in pixel-space along an associated axes. As an example, coordinates (X1, Y1) in a coordinate space of display screen 700 may map to pixels (P_X1, P_Y1) in pixel-space.

In some embodiments, a mapping function may be stored in memory of mobile computing device 104 (or computer system 102) that serves to map a given location in coordinate space of display screen 700 to coordinates in a pixel space of an image displayed on display screen 700. The coordinates in pixel-space of the image may depend on a resolution of the image that is (or is to be) captured and a resolution of display screen 700. For example, display screen 700 may have a 1920×1080 resolution, meaning that along a first axis (e.g., the X axis) there are 1920 pixels and along a second axis (e.g., the Y axis) there are 1080 pixels. Therefore, depending on the input location, the mapping function may relate the coordinates resolved on display screen 700 to coordinates in pixel-space of the image.

In some embodiments, each object depicted within an image may also have a coordinate location identified in a coordinate space of display screen 700. In some embodiments, because the object may encompass multiple intersections 814 of driving lines 812 and sensing lines 810, a region of intersections 814 may be determined initially, and each region may be used to extract coordinate locations for the object, which may then be mapped to coordinates in pixel-space. As an example, first object 702 may encompass a first region 802 and second object 704 may encompass a second region 804. A size of first region 802 and second region 804 may depend on a size of objects 702 and 704, respectively. However, in some embodiments, each region may be designated as having a same size capable of encompassing both objects.

In some embodiments, a center of each region may be determined, and the coordinates of the center of each region may be used to compute a distance in pixel-space between the corresponding object and input location 708. For instance, first region 802 may have a center point coordinates (X2, Y2) and second region 804 may have a center point coordinates (X3, Y3). In some embodiments, a same mapping function used to map coordinates (X1, Y1) of input location 708 to coordinates in pixel-space (P_X1, P_Y1) of the image may also map coordinates (X2, Y2) and (X3, Y3) to coordinates in pixel-space, such as (P_X2, P_Y2) and (P_X3, P_Y3), respectively. After obtaining the coordinates in pixel-space of each object and input location 708, a distance between each object and input location 708 may be determined. In some embodiments, instead of using center point coordinates of a region, a leading edge or trailing edge of the region may be used to identify a location of the object in coordinate space, which in turn may be mapped to coordinates in pixel-space.

Figure 9:
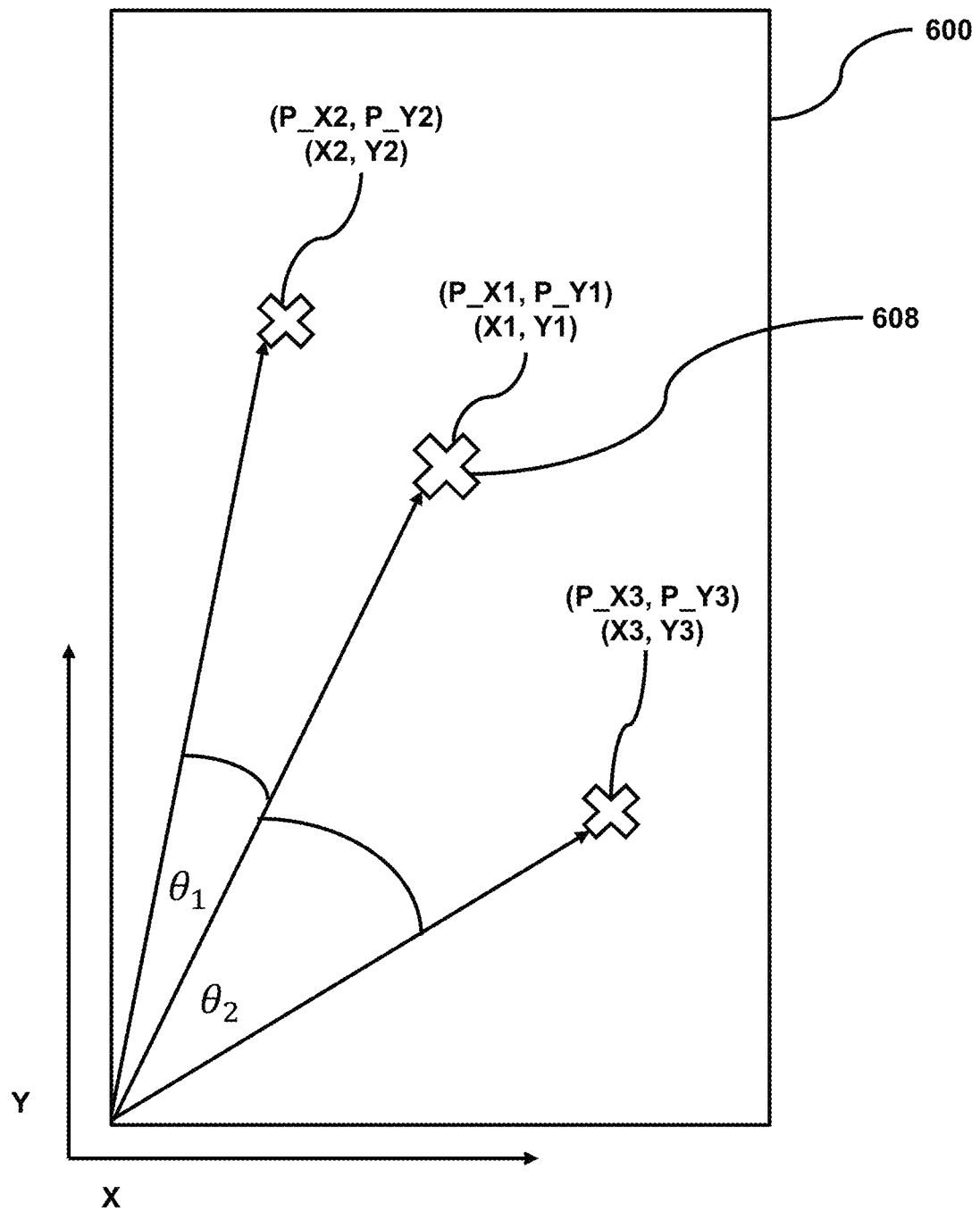
FIG. 9 illustrates an example of determining distances in pixel-space of an image between an input location of an input and objects depicted by the image, in accordance with various embodiments.

FIG. 9 illustrates an example of determining distances in pixel-space of an image between an input location of an input and objects depicted by the image, in accordance with various embodiments. In some embodiments, a first distance between coordinates in pixel-space of first object 702 and input location 708 and a second distance between coordinates in pixel-space of second object 704 and input location 708 may be determined. In some embodiments, a first vector in pixel-space beginning at the origin (e.g., a bottom left corner of display screen 700) and ending at pixel-space coordinates (P_X2, P_Y2) for first object 702 may be determined. Similarly, a second vector in pixel-space beginning at the origin and ending at pixel-space coordinates (P_X3, P_Y3) for second object 704 may be determined. The first vector may then be compared to a vector depicting input location 708 in pixel-space (e.g., coordinates (P_X1, P_Y1)) to determine a first distance D1 between input location 708 and first object 702 within the image, and a second distance D1 between input location 708 and second object 704 within the image.

In some embodiments, first distance D1 and second distance D2 may be compared to determine which distance is smaller. As an example, if first distance D1 is less than second distance D2, this may indicate that the input detected by display screen 700, and which was used to invoke a capture image operation to capture an image depicted within display screen 700, was directed towards first object 702. Therefore, a subsequent visual search performed using the image may apply a weighting factor to a region of the image encompassing object 702 as the user's intent (e.g., which object the user sought to obtain additional information about when capturing the image) may have been directed towards first object 702. In some embodiments, upon determining the object of interest based on the distances D1 and D2, the native application on mobile computing device 104 may crop the image to encompass only a portion of the image including the object of interest (e.g., first object 702 for distance D1 being less than distance D2). The cropped image may then be provided to the visual search system for performing a visual search as opposed to the entire image, which may decrease network resources by providing a smaller image to the visual search system (e.g., visual search subsystem 122). In some embodiments, portions of the image not including the region of interest (e.g., a region encompassing first object 702) may be compressed or downscaled in resolution, and the resulting version of the image may be provided to the visual search system. In some embodiments, the portion of the image including the object of interest (e.g., a region encompassing first object 702) may be enhanced, such as by causing a resolution of that region to be increased, increasing a contrast of that region, or performing any other image enhancement processing to the region, prior to being provided to the visual search system so as to improve a visual search for the object depicted within the region.

Figure 10:
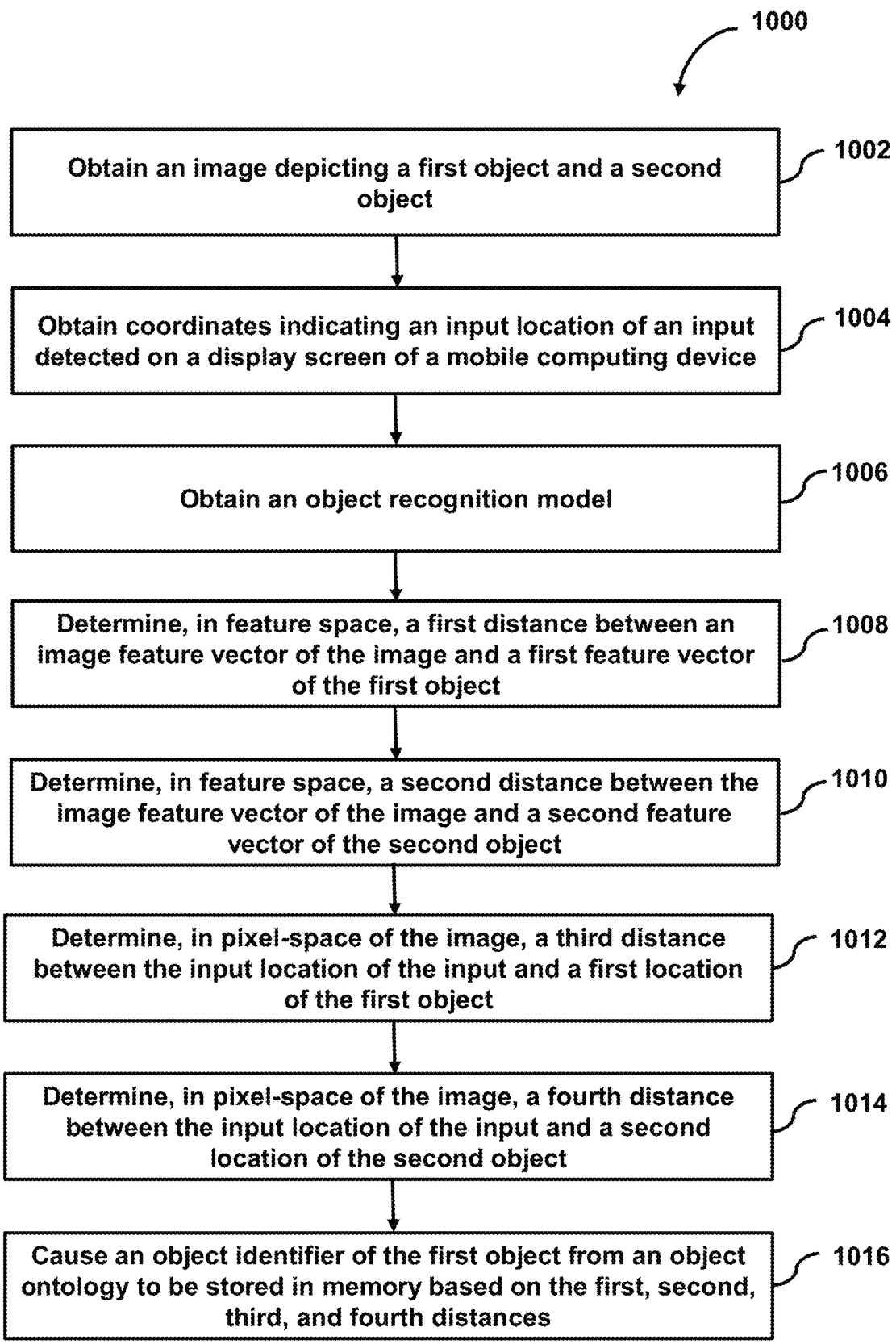
FIG. 10 illustrates an example of a process for determining an object identifier of an object to be used as an input for a visual search based on a detected input on a display screen of a mobile computing device, in accordance with various embodiments.

FIG. 10 illustrates an example of a process for determining an object identifier of an object to be used as an input for a visual search based on a detected input on a display screen of a mobile computing device, in accordance with various embodiments. In some embodiments, a process 1000 may begin at step 1002. At step 1002, an image depicting a first object and a second object may be obtained. In some embodiments, the image may be captured by a camera or other image capture component that is integrated within or communicatively coupled to mobile computing device 104, kiosk device 106, or computer system 102. As an example, an image depicting first object 702 and second object 704 may be captured. In some embodiments, the image may depict the first object and the second object at different locations within the image. For example, the first object may be located at a first location within the image and the second object may be located at a second location in the image. The locations may correspond to locations in a coordinate space of the display screen, or the coordinates may correspond to a location of each object in a pixel-space of the image. For example, first object 702 may be located at a coordinate location (X2, Y2) and second object 704 may be located at a coordinate location (X3, Y3). In some embodiments, the coordinate locations in a coordinate space of the display screen (e.g., display screen 700) may be mapped to coordinates in pixel-space of the image using a mapping function, or may be determined directly based on the image. As an example, the coordinates in pixel-space of first object 702 and second object 704 may be (P_X2, P_Y2) and (P_X3, P_Y3), respectively. In some embodiments, step 1002 may be performed by a subsystem that is the same or similar to input determination subsystem 120.

At step 1004, coordinates indicating an input location of an input detected on a display screen of a mobile computing device may be obtained. In some embodiments, the input may be a touch input, such as an on-touch event detected by an event handler of a programming interface of mobile computing device 104. Alternatively, the input may be an eye gaze or gesture that is determined to be directed towards an object (or objects) depicted within an image displayed by a display screen of mobile computing device 104. In some embodiments, the input may cause the image to be captured by a camera of mobile computing device 104. For example, instead of or in addition to including a physical or virtual button, whose invocation causes an image capture functionality of mobile computing device 104 to capture an image, an input detected by a display screen of mobile computing device 104 while rendering a UI of a native application may cause an image to be captured. In some embodiments, coordinates of the input location may be determined based on a detected portion of the display screen that the input was directed. For example, an intersection of driving and sensing lines of a touch-sensitive display screen may indicate where the input occurred on the display screen. In some embodiments, the coordinate in pixel-space of the image may be determined. For instance, the coordinates in pixel-space may be determined based on the coordinates of the input in a coordinate space of the display screen of mobile computing device 104, which may be mapped to coordinates in the pixel space of the image (e.g., based on a resolution of the image and a density of the driving and sensing lines of the touch-sensitive display screen). Alternatively, the coordinates in pixel-space of the input may be extracted directly via the native applications application programming interface (API). In some embodiments, step 1004 may be performed by a subsystem that is the same or similar to input determination subsystem 120.

At step 1006, an object recognition model may be obtained. The object recognition model may be a trained object recognition model that has been trained using a training data set including a plurality of images depicting objects. In some embodiments, the trained object recognition model may be obtained from model database 138. In some embodiments, the plurality of images included within the training data set used to train the object recognition model may each be labeled with an object identifier of an object depicted within that image. For example, an image depicting a drill may be labeled with an object identifier of the drill for performing supervised learning. In some embodiments, each object identifier may correspond to an object from an object ontology. The object ontology may include a plurality of objects, which may differ from one another or which may be similarly. For example, the object ontology may include images depicting a plurality of different objects, such as drills, baseballs, coats, etc. As another example, the object ontology may include images depicting a plurality of objects of a similar category, scene, or which are otherwise related, such as a plurality of images depicting different types of dogs, or a plurality of images depicting different construction hardware. In some embodiments, the first object and the second object depicted within the captured image (e.g., first object 702 and second object 704) may be part of the object ontology. In some embodiments, step 1006 may be performed by a subsystem that is the same or similar to input determination subsystem 120.

At step 1008, a first distance, in feature space, between an image feature vector of the image and a first feature vector of the first object may be determined. In some embodiments, the object recognition model may be used to determine whether any objects are present within the image. Object recognition model may extract visual features from the image, and may generating a feature vector describing the visual features in a continuous vector space. The feature space may correspond to an N-dimensional space. In some embodiments, the process of extracting features from an image represents a technique for reducing the dimensionality of an image, which may allow for simplified and expedited processing of the image, such as in the case of object recognition. An example of this concept is an N×M pixel red-blue-green (RBG) image being reduced from N×M×3 features to N×M features using a mean pixel value process of each pixel in the image from all three-color channels. Another example feature extraction process is edge feature detection. In some embodiments, a Prewitt kernel or a Sobel kernel may be applied to an image to extract edge features.

In some embodiments, edge features may be extracted using feature descriptors, such as a histogram of oriented gradients (HOG) descriptor, a scale invariant feature transform (SIFT) descriptor, or a speeded-up robust feature (SURF) description.

In some embodiments, the feature vector of the image may be compared to feature vectors of objects from an object ontology. The object ontology may, for example, be stored in object database 134. As mentioned previously, each object from the object ontology may be labeled with an object identifier. In some embodiments, the training data set used to train the object recognition model may include a plurality of images, each of which includes a feature vector describing visual features extracted from that image and an object identifier of a corresponding object from the object ontology that is depicted by that image. In some embodiments, a distance may be computed between the feature vector of the image and each feature vector of the images depicting objects from the training data set. Based on the distances, a determination may be made that the object depicted in the image corresponds to a first object from the object ontology labeled with a first object identifier. In some embodiments, the distance in feature space between the feature vector of the image and the feature vector of the image from the training data set depicting the first object may be determined. For example, a cosine distance, a Minkowski distance, a Euclidean distance, or another distance measure, or a combination thereof, may be used to compute the distance between the feature vector of the image and the feature vector of the image from the training data set depicting the first object. In some embodiments, step 1008 may be performed by a subsystem that is the same or similar to distance determination subsystem 122.

At step 1010, a second distance in feature space between the image feature vector of the image and a second feature vector of the second object may be determined. For instance, similar to step 1008 above, the feature vector of the image may be compared against the feature vectors of the images from the training data set to determine which object is depicted within the image. The feature vector from the training data set's images that is determined to be closest in feature space to the feature vector of the image may indicate that that object is depicted within the image. In some embodiments, if a distance between the feature vector of the image and a feature vector of an image from the training data set is less than a threshold distance value, then the image may be classified as including the object depicted by the image from the training data set. In some embodiments, the distance between the feature vector of the image and the feature vector of the classified object may be determined. For example, a cosine distance, a Minkowski distance, a Euclidean distance, or another distance measure, or a combination thereof, may be used to compute the distance between the feature vector of the image and the feature vector of the image from the training data set depicting the second object. In some embodiments, step 1010 may be performed by a subsystem that is the same or similar to distance determination subsystem 122.

At step 1012, a third distance, in pixel-space of the image, between the input location of the input and a first location of the first object may be determined. As mentioned previously, the coordinates in a coordinate space of a display screen with which the input is detected may be determined. In some embodiments, determining the coordinates in the coordinate space of the display screen of the input may include determining a location of a change in resistance of a touch-sensitive display screen, indicative of where a conductive object (e.g., a finger, stylus, etc.) interacted with the touch-sensitive display. The coordinates in the coordinate space of the display screen may be mapped to a location in pixel-space based on a precomputed mapping function. The precomputed mapping function may map each coordinate (e.g., X coordinate, Y coordinate) in the coordinate space of the display screen to a pixel or set of pixels in pixel-space for a given pixel resolution of an image. For instance, depending on the resolution of an image, the coordinate space coordinates may map to different the pixel-space coordinates. Using the coordinates in pixel space of the input, determined from the mapping of the coordinates in coordinate space of the display screen, and the coordinates of the first object in pixel-space (or coordinate space, where a similar mapping may be employed), a distance between the input's coordinates and the first object's coordinates may be determined. In some embodiments, step 1012 may be performed by a subsystem that is the same or similar to distance determination subsystem 122.

At step 1014, a fourth distance, in pixel-space of the image, between the input location of the input and a second location of the second object may be determined. In some embodiments, step 1014 may be similar to step 1012 with the exception that the distance computed is in relation to the second object, as opposed to the first object. In some embodiments, step 1014 may be performed by a subsystem that is the same or similar to distance determination subsystem 122.

At step 1016, an object identifier of the first object from an object ontology may be caused to be stored in memory based on the first distance, the second distance, the third distance, and the fourth distance. For instance, based on the first distance and the second distance, which are in feature space, a determination may be made that the first object (e.g., first object 702) depicted in the image corresponds to an object from the object ontology labeled with a first object identifier, while the second object (e.g., second object 704) depicted in the image corresponds to another object from the object ontology labeled with a second object identifier. In some embodiments, a determination may be made that, based on the third distance and the fourth distance, which are in pixel-space of the image, that the input was closer to the first object. This may indicate that the input was likely directed to the first object, and therefore the first object identifier may be assigned to the image and stored in memory in association with the image (e.g., within training data database 136). In some embodiments, the image and the first object identifier may be provided to a visual search system, such as visual search subsystem 118, to facilitate performance of a search for information related to the first object (e.g., which may be resolved as being the object from the object ontology labeled with the first object identifier). In some embodiments, step 1016 may be performed by a subsystem that is the same or similar to distance determination subsystem 122.

Figure 11:
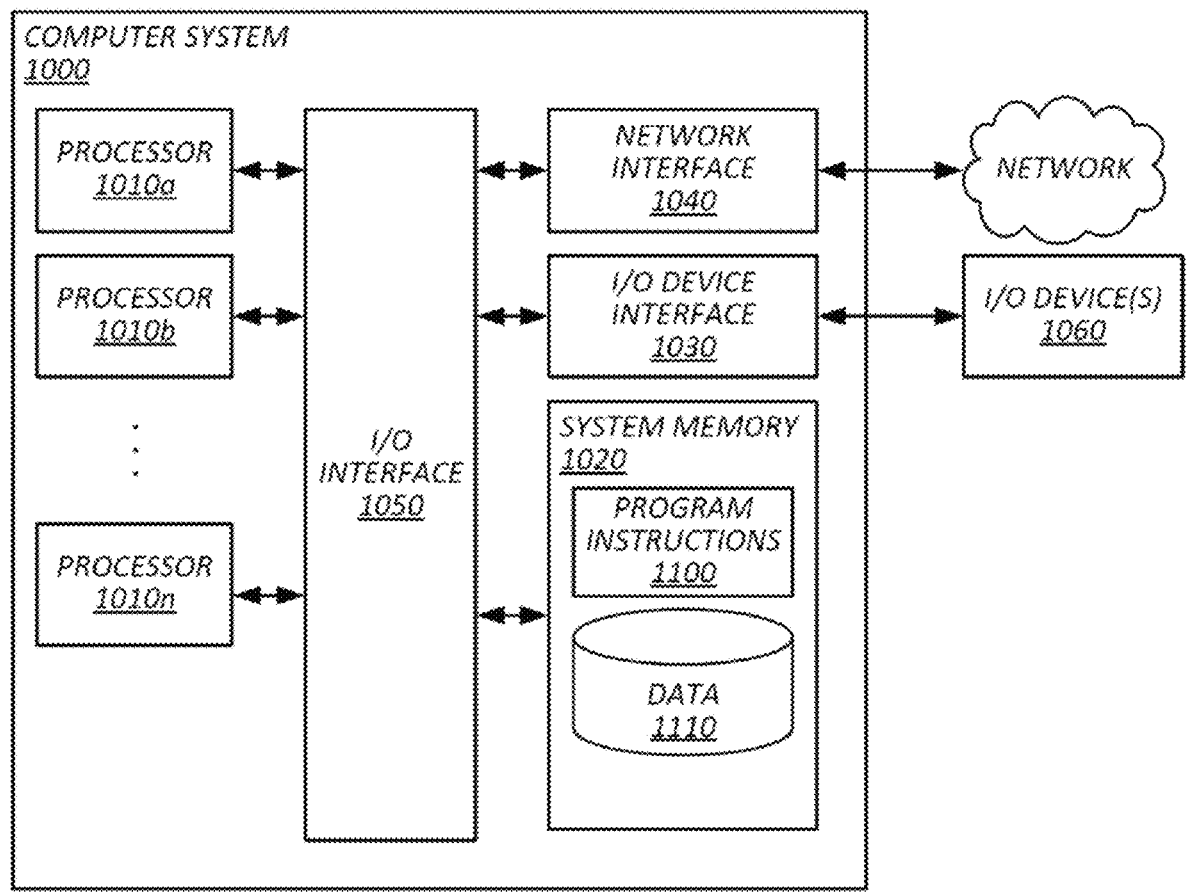
FIG. 11 illustrates an example of a computing system by which the present techniques may be implemented, in accordance with various embodiments.

FIG. 11 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010*a*-1010*n*) coupled to system memory 1020, an input/output I/O device interface 1030, and a network interface 1040 via an input/output (I/O)

interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010*a*-1010*n*) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010*a*-1010*n*) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010*a*-1010*n*, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010*a*-1010*n*). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

A1. A method comprising: obtaining, with a computer system, an image depicting an object within a context, wherein: the image is captured by a mobile computing device, the object is a member of an ontology of objects comprising a plurality of objects, and the context is a member of an ontology of contexts comprising a plurality of contexts; determining, with the computer system, with a trained context classification model, the context depicted by the image; determining, with the computer system, with a trained object detection model, a first object identifier of the object based on the image and the context; and causing, with the computer system, the first object identifier of the object to be stored in memory.

A2. The method of embodiment A1, wherein the plurality of contexts comprise at least one of: a scene depicted by the image, a location of the image, or a time when the image was captured.

A3. The method of any one of embodiments A1-A2, further comprising: determining, with the computer system, with the trained context classification model, a confidence level that the context previously determined to be depicted by the image is accurate; and determining, with the computer system, with the trained context classification model, and in response to determining the confidence level is less than a threshold confidence level, that the image depicted the object within an updated context, the updated context differing from the context.

A4. The method of any one of embodiments A1-A3, further comprising: determining, with the computer system, with the trained object detection model, a second object identifier of an additional object depicted by the image based on the first object identifier of the object and the context; and causing, with the computer system, the second object identifier of the additional object to be stored in memory, wherein the first object identifier of the object and the second object identifier of the additional object are stored in the memory in association with the image, a feature vector representing one or more visual features extracted from the image, or the image and the feature vector.

A5. The method of any one of embodiments A1-A4, wherein: the context comprises a scene of the image; and the trained context classification model comprises a trained scene classification model.

A6. The method of embodiment A5, wherein: the trained object detection model comprises an autoencoder with a continuous vector space representation; and the trained scene classification model comprises a deep neural network.

A7. The method of embodiment A6, further comprising: causing, with the computer system, an object detection model to be trained to obtain the trained object detection model, wherein: the objected detection model is trained using a training data set comprising a plurality of images, each of the plurality of images depicts an object from a subset of objects of the ontology of objects, and for a given object of the subset of objects, the plurality of images includes three or fewer images depicting the given object.

A8. The method of any one of embodiments A5-A7, wherein determining the first object identifier of the object based on the image and the scene comprises: receiving, with the computer system, a feature vector representing features extracted from the image, wherein: the object identifier of the object is determined, with the trained object detection model, based on the feature vector and the scene.

A9. The method of any one of embodiments A5-A8, wherein the first object identifier of the object is stored in the memory in association with at least one of: the image, the scene, a feature vector representing features extracted from the image, or a scene identifier of the scene.

A10. The method of any one of embodiments A1-A9, further comprising: identifying, with the computer system, a region of interest of the object within the image; cropping, with the computer system, the image to include only the region of interest; and determining, with the computer system, based on a cropped version of the image comprising the region of interest, a confidence level for the first object identifier of the object, wherein the confidence level indicates how confident the trained object detection model is that the first object identifier represents a label of the object.

A11. The method of embodiment A10, further comprising: determining, with the computer system, that the confidence level is less than a threshold confidence level, indicating that first object identifier is not able to be the label for the object; determining, with the computer system, with the trained object detection model, a second object identifier of the object based on the cropped version of the image and the context; and causing, with the computer system, in response to determining that a confidence level for the second object identifier of the object is greater than or equal to the threshold confidence level, the second object identifier of the object to be stored in the memory in place of the first object identifier.

A12. The method of any one of embodiments A1-A11, further comprising: generating, with the computer system, a training data set for training a computer vision search system to detect the object within a query image, wherein the training data set is generated based on: the first object identifier of the object, one or more features extracted from the image, or the first object identifier and the one or more features extracted from the image; and causing, with the computer system, the computer vision search system to be trained based on the training data to form a trained computer vision search system.

A13. The method of embodiment A12, further comprising: obtaining, with the computer system, a new image; and determining, with the computer system, with the trained computer vision search system, that the new image depicts the object.

A14. The method of embodiment A13, wherein the computer system comprises a kiosk configured to capture the new image and provide information regarding the object for display via the kiosk.

B1. A method comprising: obtaining, with a computer system, (i) an image captured by a mobile computing device and (ii) coordinates indicating an input location of an input detected on a display screen of the mobile computing device, wherein: the input caused the image to be captured, the input location is a location in pixel-space of the image, and the image depicts a first object located at a first location in the image and a second object located at a second location in the image; obtaining, with the computer system, a computer-vision object recognition model trained using a training data set comprising images depicting objects, wherein: each image of the training data set is labeled with an object identifier, each object identifier indicates an object in an object ontology depicted by a corresponding image, and the object ontology comprises the first object and the second object; detecting, with the computer system, with the computer-vision object recognition model, the first object based on: distances in a feature space of the computer-vision object recognition model between: an image feature vector of the image and a first feature vector of the first object in the computer-vision object recognition model, and the image feature vector of the image and a second feature vector of the second object in the computer-vision object recognition model; and distances in the pixel-space of the image between: the input location of the input and the first location of the first object, and the input location of the input and the second location of the second object; and causing, with the computer system, a first object identifier of the first object from the object ontology to be stored in memory.

B2. The method of embodiment B 1, further comprising: providing, with the computer system, the first object identifier to a computer vision search system to obtain information indicating at least one of: a location of the first object, an availability to purchase the first object, one or more related objects, or a name of the first object.

B3. The method of any one of embodiments B1-B2, wherein the object ontology further comprises a third object not depicted in the image, detecting the first object further comprises: detecting, with the computer system, the first object based on a distance in the feature space of the computer-vision object recognition model between the image vector of the image and a third feature vector of the third object in the computer-vision object recognition model.

B4. The method of any one of embodiments B1-B3, wherein the distances in the feature space comprise Euclidean distances, Minkowski distances, or cosine distances.

B5. The method of any one of embodiments B1-B4, wherein causing the first object identifier of the first object to be stored in the memory comprises: causing, with the computer system, in response to the first object being detected, the first object identifier of the first object to be stored in the memory, wherein: the first object identifier of the first object is stored in the memory in association with the first image, one or more features extracted from the first image, or the first image and the one or more features extracted from the first image.

B6. The method of any one of embodiments B1-B5, wherein the input comprises at least one of: a touch event whereby a capacitive input mechanism is determined to have touched the display screen of the mobile computing device at the input location, wherein the display screen comprises a capacitive touch screen; a gesture detected by the mobile computing device or a gesture acquisition device communicatively coupled to the mobile computing device, wherein the gesture is determined to be directed to the input location; or an eye gaze detected by the mobile computing device or an eye tracking device communicatively coupled to the mobile computing device, wherein the eye gaze is determined by tracking a user's eyes, wherein the input location is determined based on the user's eyes being tracked to the input location and dwelling on the input location for more than a threshold amount of time.

B7. The method of any one of embodiments B1-B6, wherein detecting the first object based on the distances in the feature space comprises: determining, with the computer system, a first distance between the image feature vector of the image and the first feature vector of the first object; determining, with the computer system, a second distance between the image feature vector of the image and the second feature vector of the second object; and determining, with the computer system, whether the first distance and the second distance are less than a predefined threshold distance; and selecting, with the computer system, based on the first distance being less than the predefined threshold distance and the second distance being greater than the predefined threshold distance, the first object.

B8. The method of any one of embodiments B1-B7, wherein detecting the first object based on the distances in the pixel-space of the image comprises: determining, with the computer system, a first distance in the pixel-space between the input location of the input and the first location of the first object depicted within the image; determining, with the computer system, a second distance in the pixel-space between the input location of the input and the second location of the second object depicted within the image; selecting, with the computer system, the first object based on the first distance being less than the second distance indicating that the input is directed to the first object.

B9. The method of any one of embodiments B1-B8, further comprising: determining, with the computer system, a second object identifier of the second object from the object ontology based on the first object identifier of the first object; and causing, with the computer system, the second object identifier of the second object to be stored in the memory.

B10. The method of embodiment B9, further comprising: causing, with the computer system, a first search to be performed for first information related to the first object using the first object identifier as a first query input for the first search; causing, with the computer system, a second search to be performed for second information related to the second object using the second object identifier as a second query input for the second search; and providing, with the computer system, for display on the display screen of the mobile computing device, a kiosk device including a display screen, or the display screen of the mobile computing device and the kiosk device, at least some of the first information and at least some of the second information.

B11. The method of any one of embodiments B1-B10, wherein detecting the first object comprises: determining, with the computer system, a first score indicating how similar the first object in the image is to a first identified object from the object ontology represented by the first object identifier; determining, with the computer system, a second score indicating how similar the second object in the image is to a second identified object from the object ontology represented by a second object identifier; generating, with the computer system, a first revised score based on the first score and a first weight applied to the first score, wherein the first weight is determined based on a first distance between the input location of the input and the first location of the first object; generating, with the computer system, a second revised score based on the second score and a second weight applied to the second score, wherein the second weight is determined based on a second distance between the input location of the input and the second location of the first object; and selecting, with the computer system, the first object based on the first revised score and the second revised score.

B12. The method of any one of embodiments B1-B11, further comprising: generating, with the computer system, an enhanced version of the image by enhancing the image in a region of the image surrounding the input location, wherein the enhancing the image comprises performing, to the region surrounding the input location, at least one of: light balance enhancement, shadow removal, pattern recognition, or color spectrum recognition.

B13. The method of any one of embodiments B1-B12, further comprising: generating, with the computer system, a compressed version of the image by compressing portions of the image further than a threshold distance from the input location, wherein compressing the portions of the image comprise: segmenting the image into blocks, identifying a set of blocks encompassing the input location, compressing pixels in each remaining block from the blocks excluding the set of blocks with a first amount of loss, and compressing pixels in each block of the set of blocks with a second amount of loss, wherein the second amount of loss is smaller than the first amount of loss.

B14. The method of any one of embodiments B1-B13, wherein the computer-vision object recognition model comprises a convolutional neural network having three or more layers.

C1. A tangible, non-transitory, machine-readable medium storing instructions that when executed by a data processing apparatus cause the data processing apparatus to perform operations comprising: a method of any one of embodiments A1-A14 or B1-B14.

D1. A system, comprising: one or more processors; and memory storing instructions that when executed by the processors cause the processors to effectuate operations comprising: a method of any one of embodiments A1-A14 or B1-B14.

What is claimed is:

1. A tangible, non-transitory, computer-readable medium storing computer program instructions that when executed by one or more processors effectuate operations comprising:
obtaining, with a computer system, an image depicting an object within a context, wherein:
the context is a scene depicted by the image,
the image is captured by a mobile computing device,
the object is a member of an ontology of objects comprising a plurality of objects, and
the context is a member of an ontology of contexts comprising a plurality of contexts;
determining, with the computer system, with a trained context classification model, the context depicted by the image, wherein:
the trained context classification model comprises a trained scene classification model by which the scene is classified,
the trained scene classification model outputs a scene classification for the image, and the determined scene comprises background information that is different from the object;
providing, with the computer system, the scene classification and the image to a trained object detection model as inputs to the trained object detection model;
determining, with the computer system, with the trained object detection model, in response to the trained object detection model receiving the scene classification and the image, a first object identifier of the object based on the image and the context scene classification; and
causing, with the computer system, the first object identifier of the object to be stored in memory.

2. The tangible, non-transitory, computer-readable medium of claim 1, wherein the operations further comprise:
determining, with the computer system, with the trained context classification model, a confidence level associated with the context;
obtaining, with the computer system, the object identifier of the object, the context of image including the scene classification of the image, the confidence level associated with the context, and the image;
providing, with the computer system, the object identifier of the object, the context of the image, the confidence level associated with the context, and the image to the trained context classification model; and
determining, with the computer system, with the trained context classification model, and in response to determining the confidence level is less than a threshold confidence level, an updated context of the image based on the context of the image, the object identifier of the object, and the image, wherein:
the updated context differs from the context, and
the updated context comprises an updated scene classification of the scene depicted by the image.

3. The tangible, non-transitory, computer-readable medium of claim 1, wherein the operations further comprise:
determining, with the computer system, with the trained object detection model, in response to the trained object detection model receiving the scene classification and the image, a second object identifier of an additional object depicted by the image based on the first object identifier of the object and the scene classification; and
causing, with the computer system, the second object identifier of the additional object to be stored in memory, wherein the first object identifier of the object and the second object identifier of the additional object are stored in the memory in association with the image, a feature vector representing one or more visual features extracted from the image, or the image and the feature vector.

4. The tangible, non-transitory, computer-readable medium of claim 1, wherein:
the trained object detection model comprises an autoencoder with a continuous vector space representation; and
the trained scene classification model comprises a deep neural network.

5. The tangible, non-transitory, computer-readable medium of claim 4, wherein the operations further comprise:
causing, with the computer system, an object detection model to be trained to obtain the trained object detection model, wherein:
the objected detection model is trained using a training data set comprising a plurality of images,
each of the plurality of images depicts an object from a subset of objects of the ontology of objects, and
for a given object of the subset of objects, the plurality of images includes three or fewer images depicting the given object.

6. The tangible, non-transitory, computer-readable medium of claim 1, wherein determining the first object identifier of the object based on the image and the scene classification comprises:
receiving, with the computer system, a feature vector representing features extracted from the image, wherein:
the object identifier of the object is determined, with the trained object detection model, based on the feature vector and the scene classification.

7. The tangible, non-transitory, computer-readable medium of claim 1, wherein the first object identifier of the object is stored in the memory in association with at least one of: the image, a feature vector representing features extracted from the image, or a scene identifier of the scene classification.

8. The tangible, non-transitory, computer-readable medium of claim 1, wherein the operations further comprise:
identifying, with the computer system, a region of interest of the object within the image;
cropping, with the computer system, the image to include only the region of interest; and
determining, with the computer system, based on a cropped version of the image comprising the region of interest, a confidence level for the first object identifier of the object, wherein the confidence level indicates how confident the trained object detection model is that the first object identifier represents a label of the object.

9. The tangible, non-transitory, computer-readable medium of claim 8, wherein the operations further comprise:
determining, with the computer system, that the confidence level is less than a threshold confidence level, indicating that the first object identifier is not able to be the label for the object;
determining, with the computer system, with the trained object detection model, a second object identifier of the object based on the cropped version of the image and the scene classification; and
causing, with the computer system, in response to determining that a confidence level for the second object identifier of the object is greater than or equal to the threshold confidence level, the second object identifier of the object to be stored in the memory in place of the first object identifier.

10. The tangible, non-transitory, computer-readable medium of claim 1, wherein the operations further comprise:
generating, with the computer system, a training data set for training a computer vision search system to detect the object within a query image, wherein the training data set is generated based on at least one of: the first object identifier of the object, one or more features extracted from the image, or a context label of the context of the image, wherein the context label indicates the scene classification of the scene; and
causing, with the computer system, the computer vision search system to be trained based on the training data to form a trained computer vision search system.

11. The tangible, non-transitory, computer-readable medium of claim 10, wherein the operations further comprise:
obtaining, with the computer system, a new image; and
determining, with the computer system, with the trained computer vision search system, that the new image depicts the object.

12. The tangible, non-transitory, computer-readable medium of claim 11, wherein the computer system comprises a kiosk configured to capture the new image and provide information regarding the object for display via the kiosk.

13. A method, comprising:
obtaining, with a computer system, an image depicting an object within a context, wherein:
the context is a scene depicted by the image,
the image is captured by a mobile computing device,
the object is a member of an ontology of objects comprising a plurality of objects, and
the context is a member of an ontology of contexts comprising a plurality of contexts;
determining, with the computer system, with a trained context classification model, the context depicted by the image, wherein:
the trained context classification model comprises a trained scene classification model by which the scene is classified,
the trained scene classification model outputs a scene classification, and
the determined scene comprises background information that is different from the object;
providing, with the computer system, the scene classification and the image to a trained object detection model as input to the trained object detection model;
determining, with the computer system, with the trained object detection model, in response to the trained object detection model receiving the scene classification vector and the image, a first object identifier of the object based on the image and the scene classification; and
causing, with the computer system, the first object identifier of the object to be stored in memory.

14. The tangible, non-transitory, computer-readable medium of claim 1, wherein providing the image to the trained object detection model is performed by cropping the image and providing a result of the cropping to the trained object detection model.

15. A tangible, non-transitory, computer-readable medium storing computer program instructions that when executed by one or more processors effectuate operations comprising:
obtaining, with a computer system, an image depicting an object within a scene, wherein:
the scene comprises background information that is different from the object,
the image is captured by a mobile computing device,
the object is a member of an ontology of objects comprising a plurality of objects, and
the scene is a member of an ontology of scenes comprising a plurality of scenes;
determining, with the computer system, with a trained scene classification model, a scene classification of the scene depicted by the image, wherein the trained scene classification model outputs the scene classification;
providing, with the computer system, the scene classification and at least one of the image or an adjusted version of the image to a trained object detection model;
determining, with the computer system, with the trained object detection model, in response to the trained object detection model receiving the scene classification and the at least one of the image or the adjusted version of the image, a first object identifier of the object based on the scene classification and the at least one of the image or the adjusted version of the image; and
causing, with the computer system, the first object identifier of the object to be stored in memory.

16. A method, comprising:
obtaining, with a computer system, an image depicting an object within a scene, wherein:
the scene comprises background information that is different from the object,
the image is captured by a mobile computing device,
the object is a member of an ontology of objects comprising a plurality of objects, and
the scene is a member of an ontology of scenes comprising a plurality of scenes;
determining, with the computer system, with a trained scene classification model, a scene classification of the scene depicted by the image, wherein the trained scene classification model outputs the scene classification;
providing, with the computer system, the scene classification and at least one of the image or an adjusted version of the image to a trained object detection model;
determining, with the computer system, with the trained object detection model, in response to the trained object detection model receiving the scene classification and the at least one of the image or the adjusted version of the image, a first object identifier of the object based on the scene classification and the at least one of the image or the adjusted version of the image; and
causing, with the computer system, the first object identifier of the object to be stored in memory.

17. The method of claim 16, further comprising:
determining, with the computer system, with the trained scene classification model, a confidence level associated with the scene classification;
obtaining, with the computer system, the object identifier of the object, the scene classification, the confidence level associated with the scene classification, and the image;
providing, with the computer system, subsequent to determining the first object identifier of the object, the first object identifier of the object, the scene classification, the confidence level associated with the scene classification, and the image, to the trained scene classification model; and
determining, with the computer system, with the trained scene classification model, and in response to determining the confidence level is less than a threshold confidence level, an updated scene classification based on the first object identifier of the object, the scene classification, and the image, wherein:
the updated scene classification differs from the scene classification, and
the updated scene classification indicates an updated scene with which the image depicts.

18. The method of claim 16, comprising:
steps for detecting objects based on scene classifications.

19. The method of claim 16, wherein:
the trained object detection model comprises an autoencoder configured to map images to locations in a continuous vector space representation of the images, the continuous vector space having fewer dimensions than the images; and
the trained scene classification model comprises a deep neural network.

20. The method of claim 19, further comprising:
causing, with the computer system, an object detection model to be trained to obtain the trained object detection model, wherein:

the objected detection model is trained using a training data set comprising a plurality of images, each of the plurality of images depicts an object from a subset of objects of the ontology of objects, and for a given object of the subset of objects, the plurality of images includes three or fewer images depicting the given object.

21. The method of claim 16, wherein determining the first object identifier of the object based on the scene classification and the at least one of the image or the adjusted version of the image comprises:

receiving, with the computer system, a feature vector representing features extracted from the at least one of the image or the adjusted version of the image, wherein:

the first object identifier of the object is determined, with the trained object detection model, based on the feature vector and the scene classification.

22. The method of claim 16, comprising:

steps for classifying a scene in an image.

23. The method of claim 16, further comprising:

identifying, with the computer system, a bounding region of the object within the image;

obtaining, with the computer system, a cropped version of the image by cropping the image to exclude at least some areas outside the bounding region; and determining, with the computer system, based on the cropped version of the image comprising the region of interest, a confidence level for the first object identifier of the object, wherein the confidence level indicates how confident the trained object detection model is that the first object identifier represents a label of the object.

24. The method of claim 23, further comprising:

determining, with the computer system, that the confidence level is less than a threshold confidence level, indicating that the first object identifier is not able to be the label for the object;

determining, with the computer system, with the trained object detection model, a second object identifier of the object based on the cropped version of the image and the scene classification; and causing, with the computer system, in response to determining that a confidence level for the second object identifier of the object is greater than or equal to the threshold confidence level, the second object identifier of the object to be stored in the memory in place of the first object identifier.

25. The method of claim 16, further comprising:

generating, with the computer system, a training data set for training a computer vision search system to detect the object within a query image, wherein the training data set is generated based on at least one of: the first object identifier of the object, one or more features extracted from the at least one of the image or the adjusted version of the image, or the scene classification of the scene; and causing, with the computer system, the computer vision search system to be trained based on the training data set to form a trained computer vision search system.

26. The method of claim 25, further comprising:

obtaining, with the computer system, a new image; and determining, with the computer system, with the trained computer vision search system, that the new image depicts the object.

27. The method of claim 26, wherein the computer system comprises a kiosk configured to capture the new image and provide information regarding the object for display via the kiosk.

* * * * *